Fig. 2

July 31, 1951 — S. FLAM — 2,562,541
CONCRETE BLOCK MOLDING MACHINE
Filed May 18, 1946 — 14 Sheets-Sheet 4

INVENTOR
Stephen Flam
BY John Flam
ATTORNEY

July 31, 1951  S. FLAM  2,562,541
CONCRETE BLOCK MOLDING MACHINE
Filed May 18, 1946  14 Sheets-Sheet 5
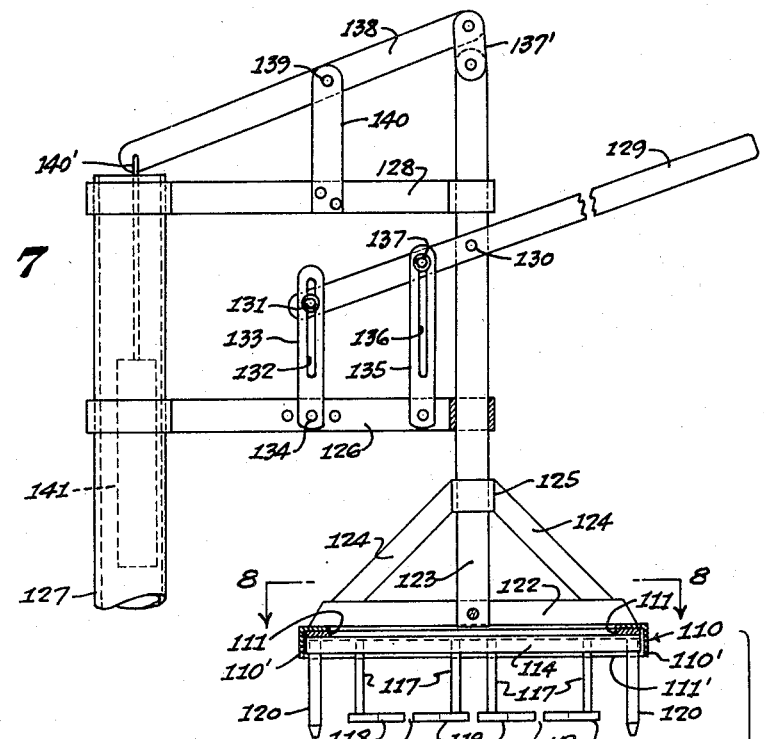
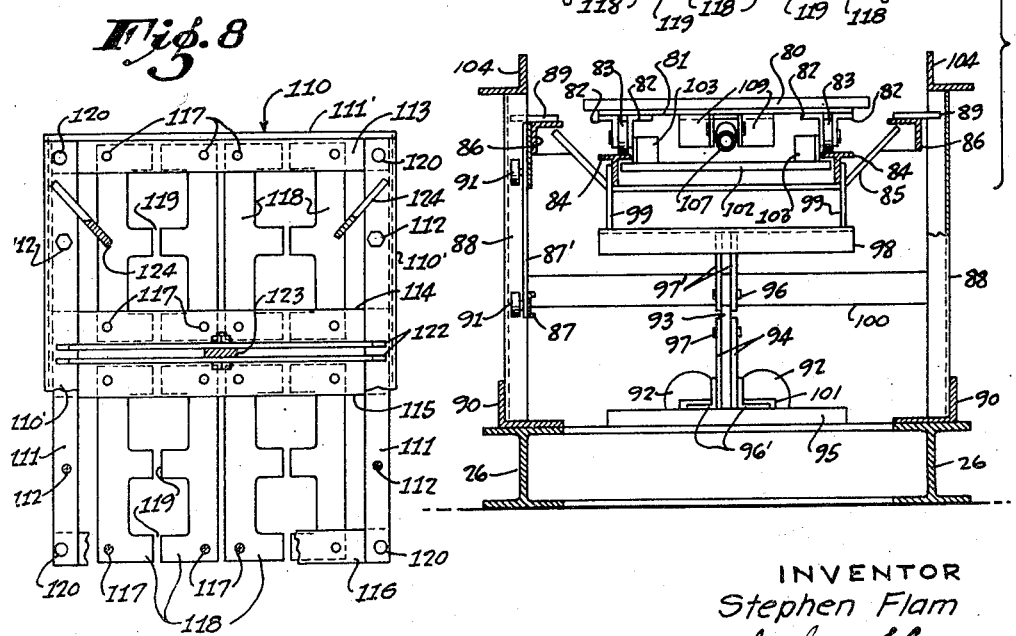
INVENTOR
Stephen Flam
BY John Flam
ATTORNEY

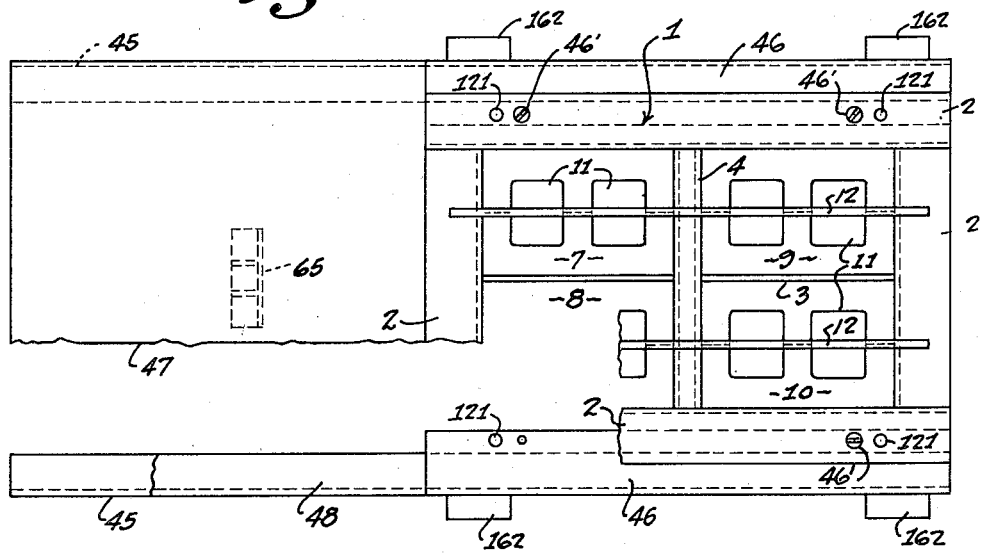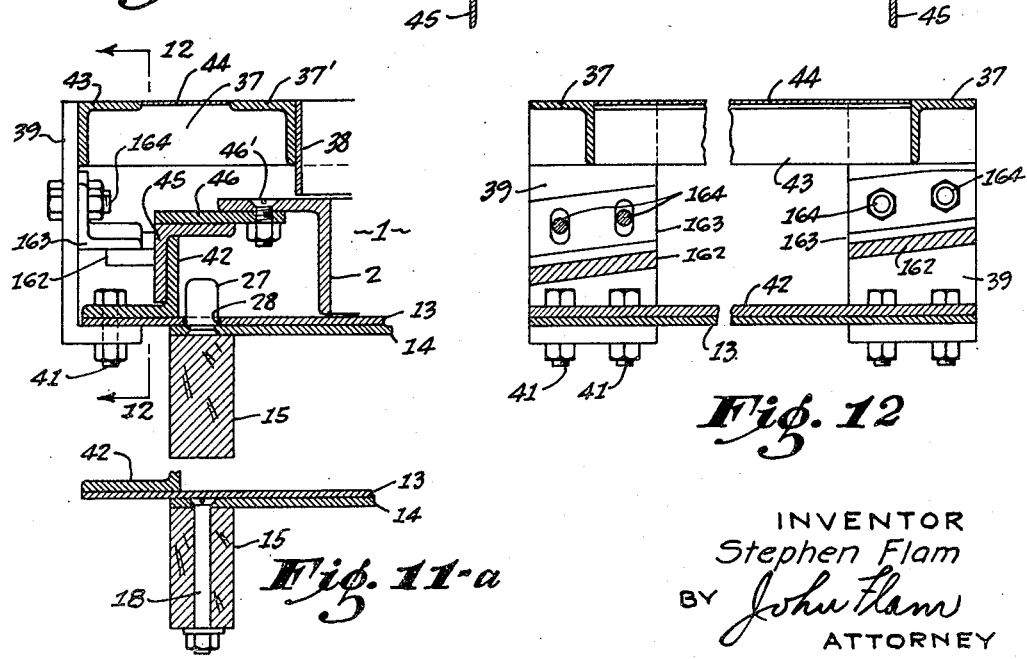

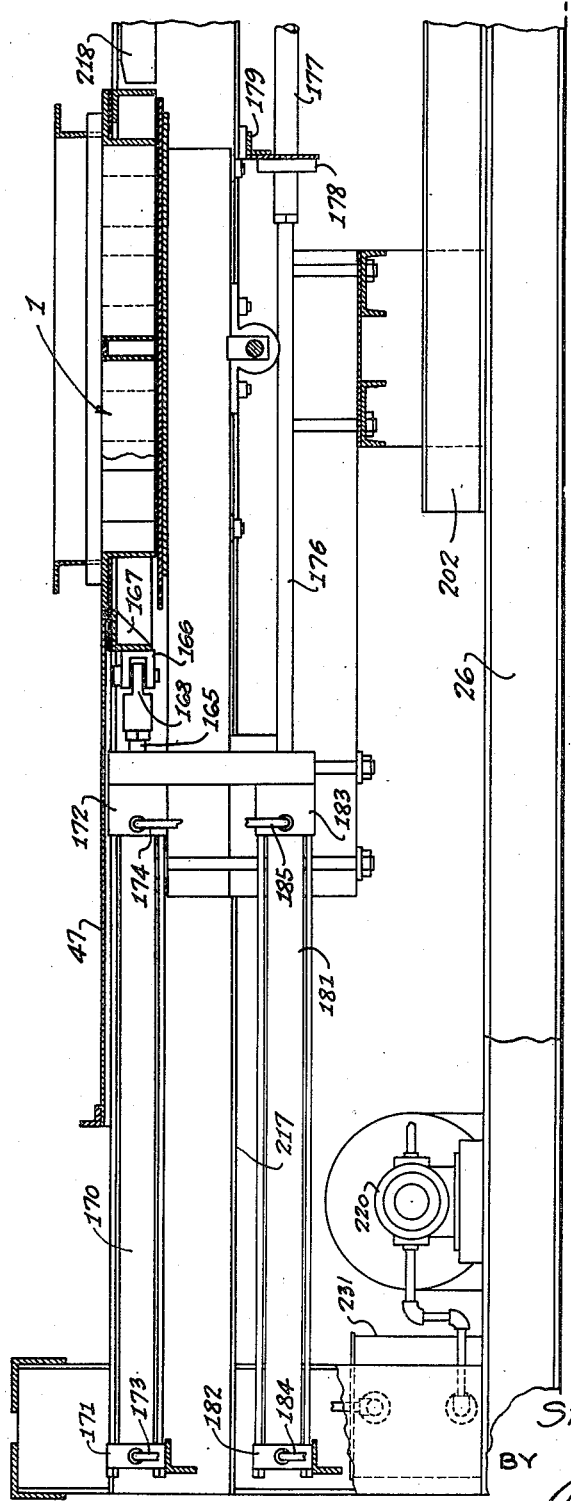

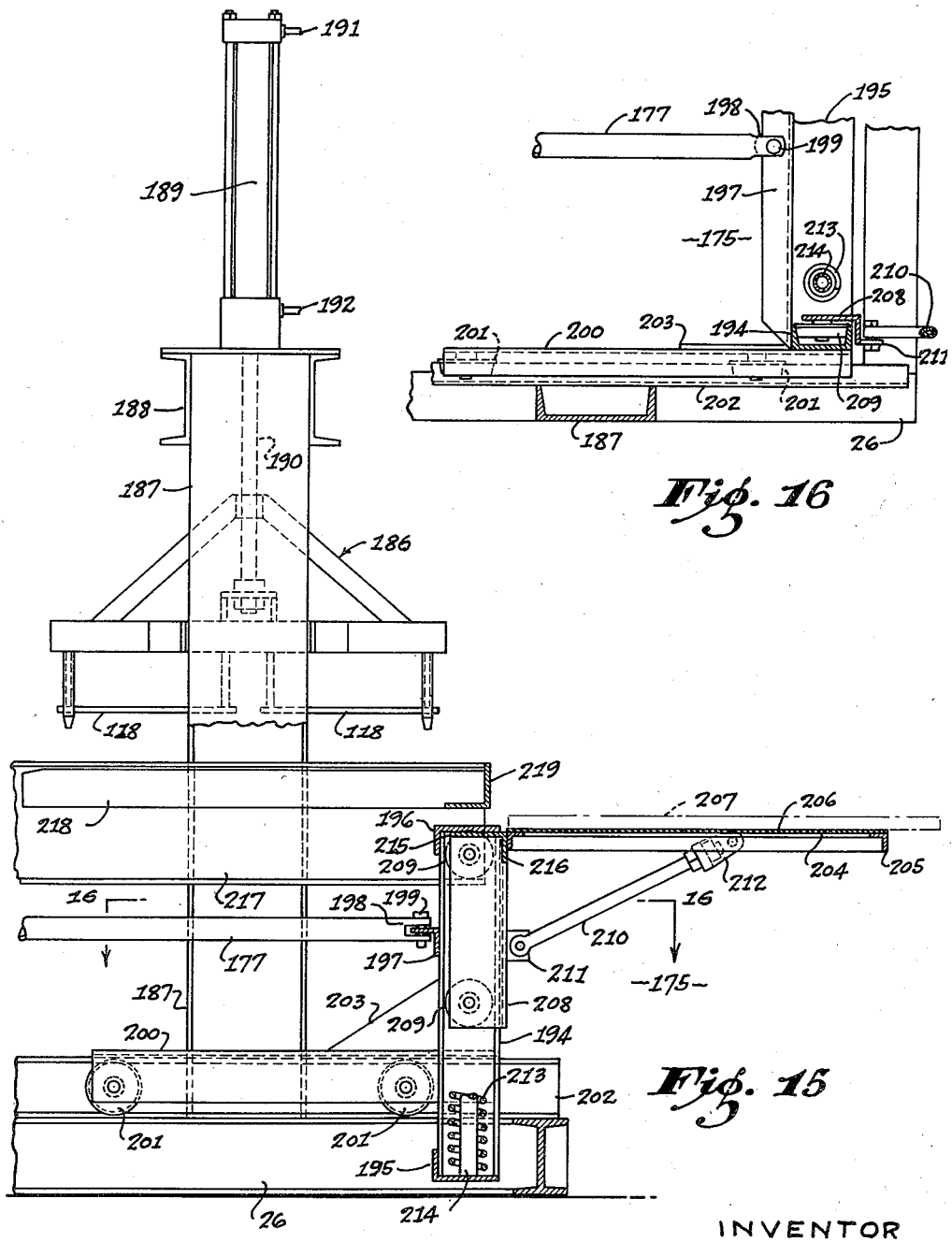

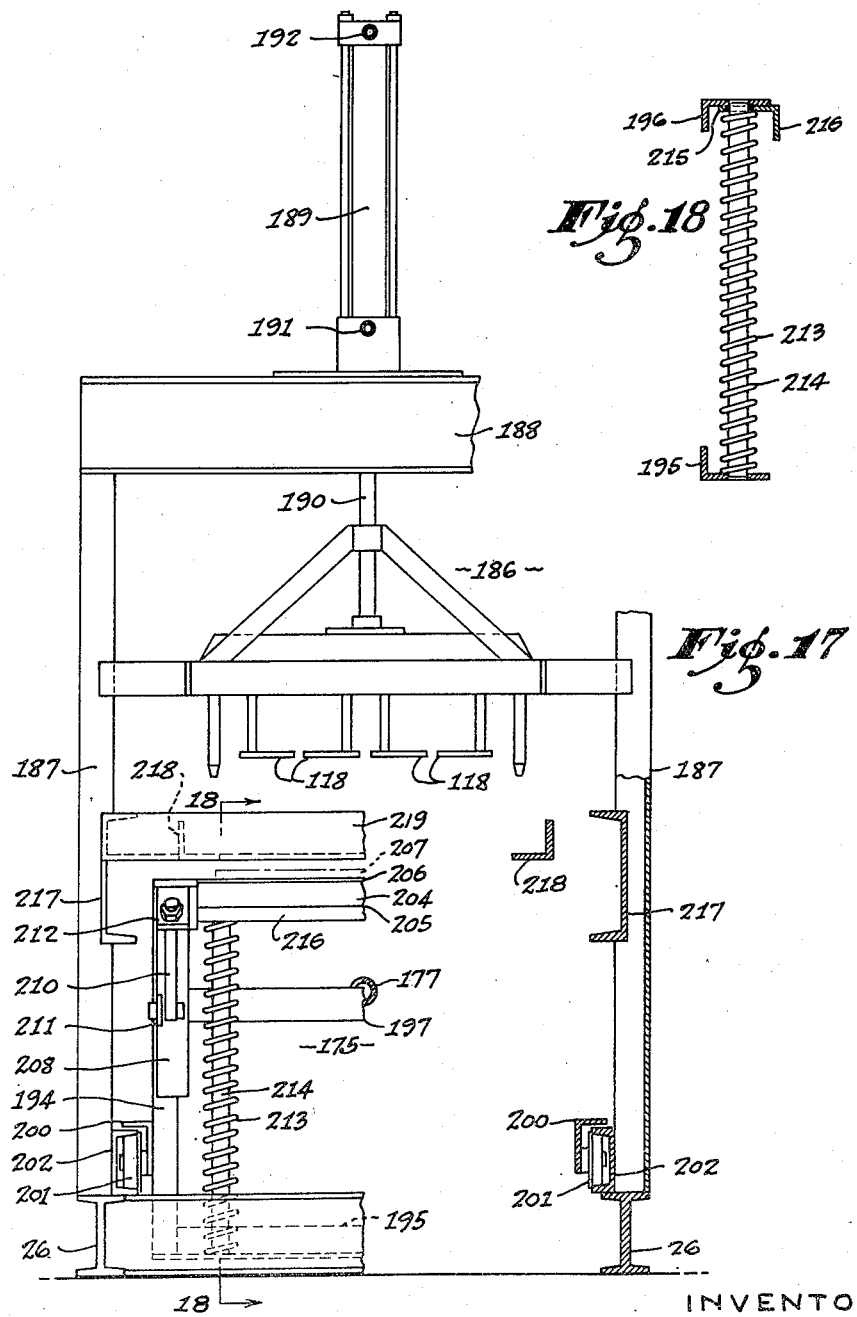

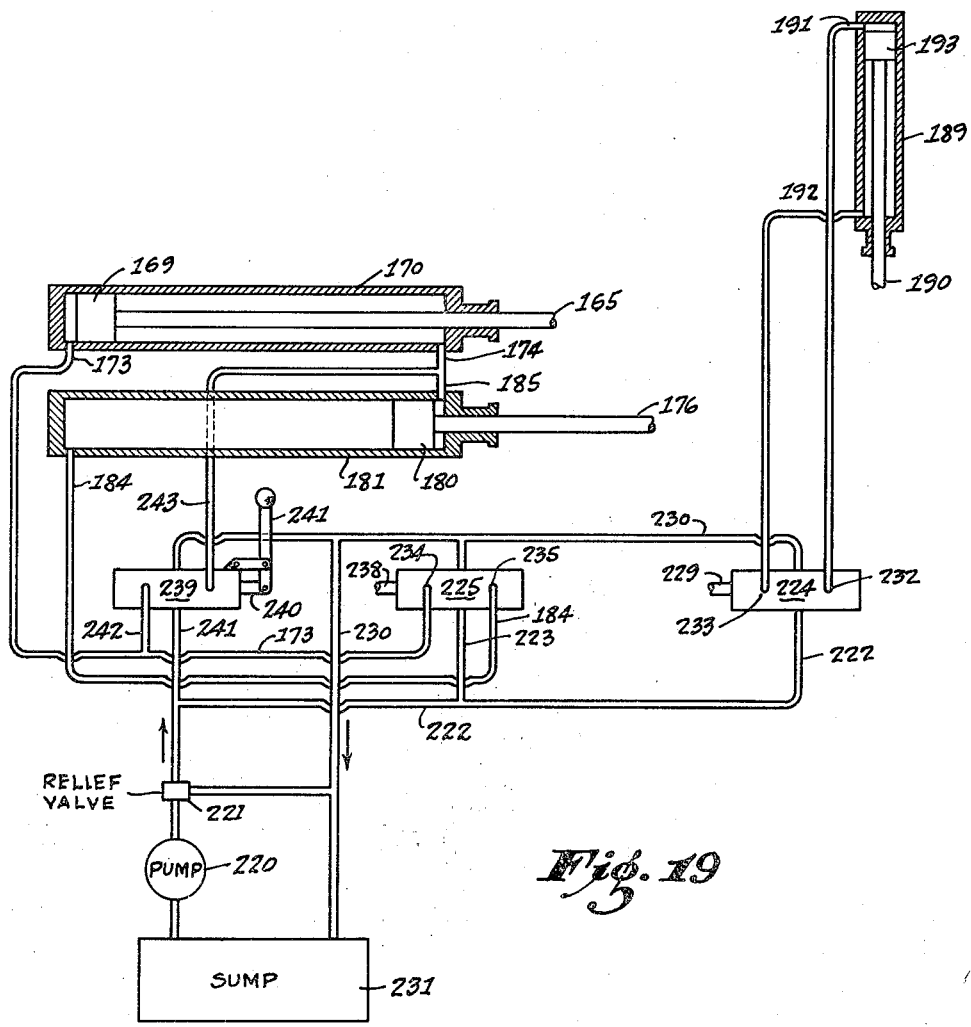

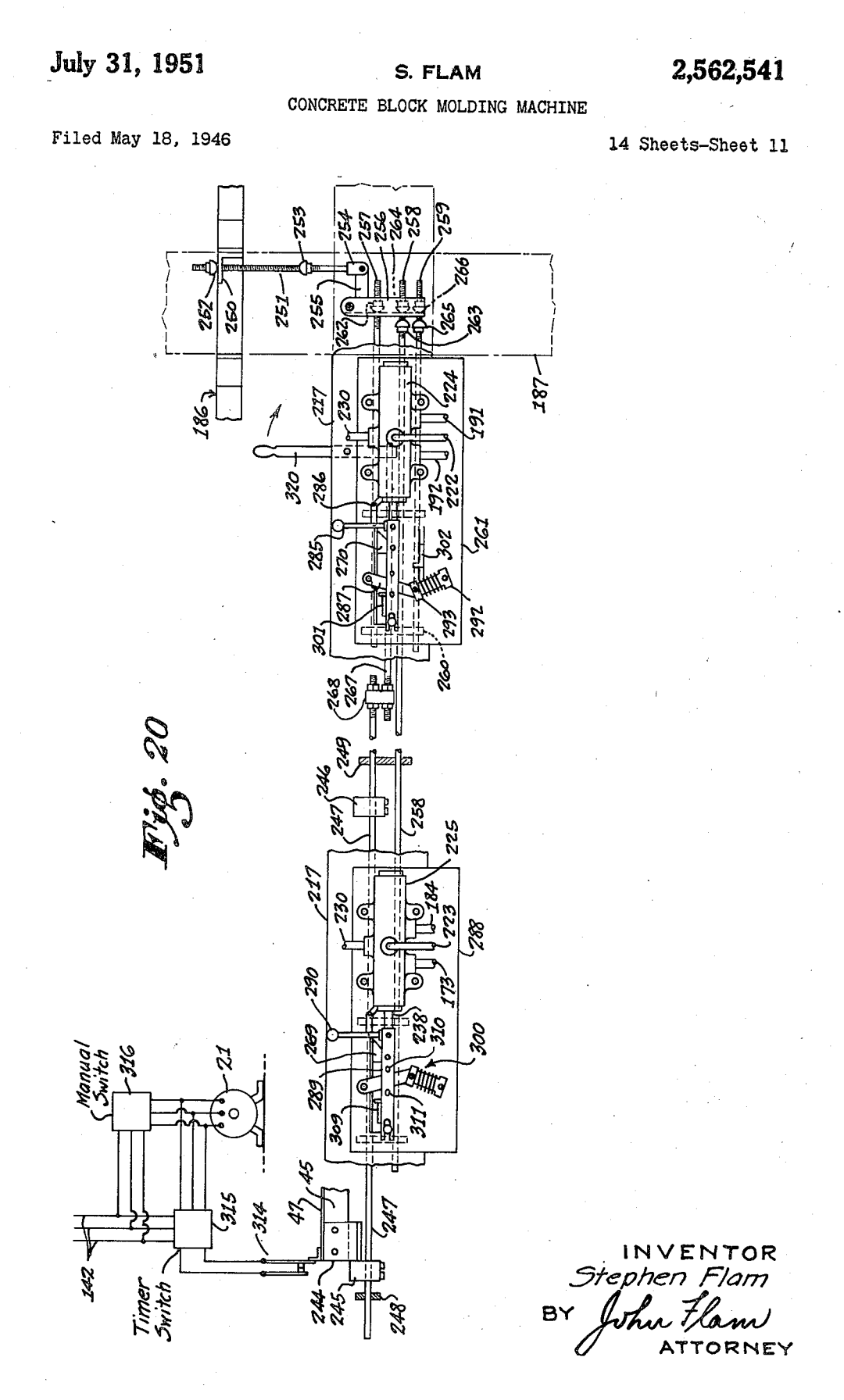

July 31, 1951         S. FLAM         2,562,541

CONCRETE BLOCK MOLDING MACHINE

Filed May 18, 1946         14 Sheets-Sheet 11

INVENTOR
Stephen Flam
BY John Flam
ATTORNEY

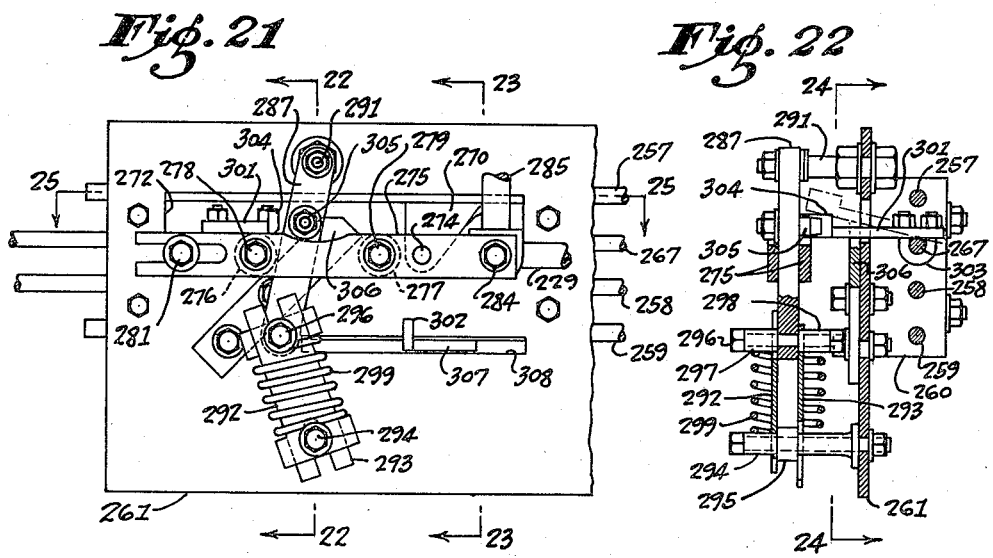
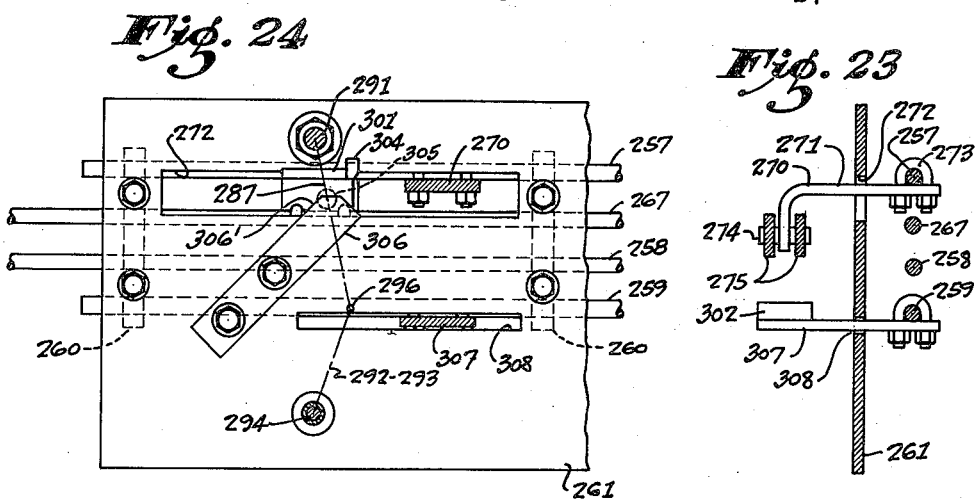
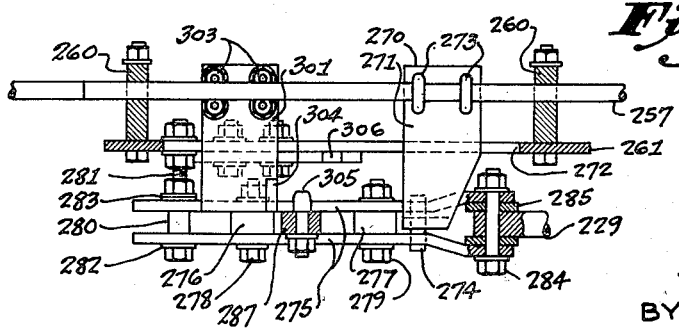

July 31, 1951  S. FLAM  2,562,541
CONCRETE BLOCK MOLDING MACHINE
Filed May 18, 1946  14 Sheets-Sheet 13
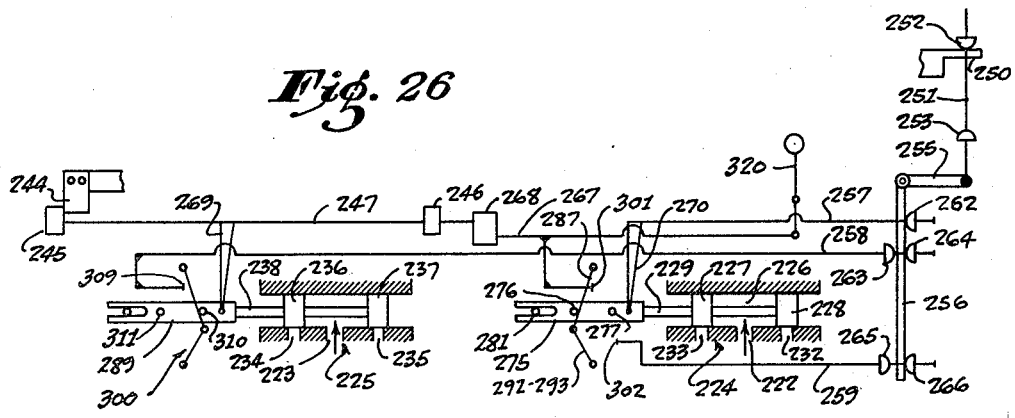
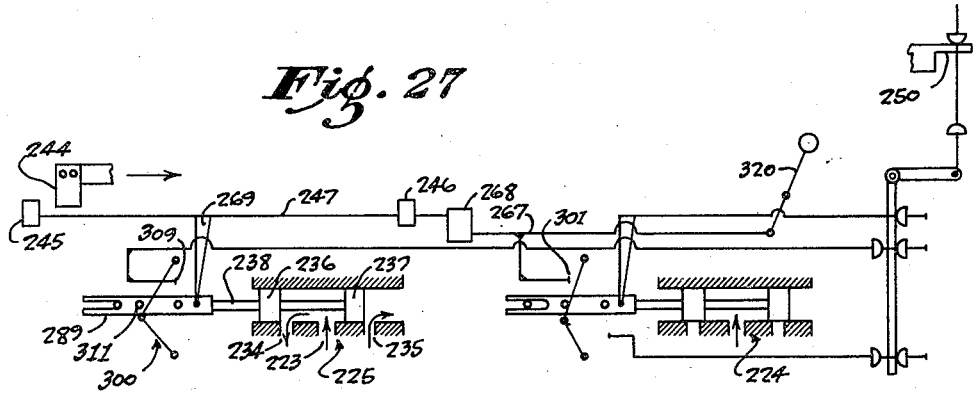
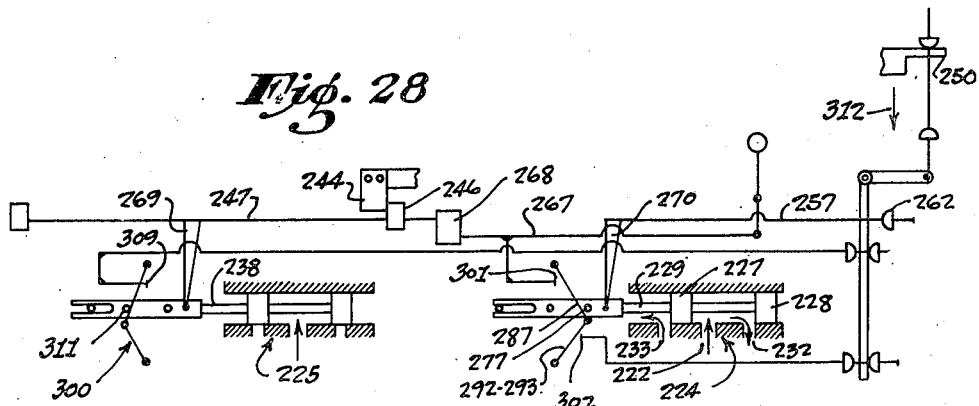
INVENTOR
Stephen Flam
BY John Flam
ATTORNEY July 31, 1951 S. FLAM 2,562,541
CONCRETE BLOCK MOLDING MACHINE
Filed May 18, 1946 14 Sheets-Sheet 14

INVENTOR
Stephen Flam
BY John Flam
ATTORNEY

Patented July 31, 1951

2,562,541

UNITED STATES PATENT OFFICE 2,562,541

CONCRETE BLOCK MOLDING MACHINE

Stephen Flam, Van Nuys, Calif.; John Flam, Joseph Flam, and August Flam executors of said Stephen Flam, deceased Application May 18, 1946, Serial No. 670,710

26 Claims. (Cl. 25—41)

This invention relates to a machine for molding plastic material, such as cement or concrete building blocks.

It is one of the objects of this invention to provide in general a highly efficient machine of this character.

In the process of molding blocks, the steps include filling the mold, vibrating the mold to compact the plastic material, striking off the excess material, and stripping the mold from the cast material.

Automatic machinery capable of performing these steps in proper sequence is available; but such machines are expensive and require considerable floor space. It is one of the objects of this invention to provide a compact and inexpensive molding machine capable of performing these steps with the aid of but little manual work by the operator.

In order that the molding operation be effectively accomplished, the machine in this case is so arranged that the filling of the mold and its vibration occur substantially simultaneously. After the mold is filled, it is moved to a stripping station; and this movement is utilized to strike off the excess material. At the stripping station the mold may be stripped, and the cast blocks are deposited on a pallet disposed below the mold.

It is another object of this invention to facilitate the stripping operation (either by power or manually). This is specifically accomplished by moving the filled mold off a plate that defines the mold bottom to a near by stripping position immediately above a pallet. All this is done rapidly and without requiring reversal of the mold. The stripping operation is accomplished by pressure exerted over the top surfaces of the cast blocks.

It is another object of this invention to synchronize the movement of the mold and the pallet by the application of power (either manual, mechanical, or hydraulic), so that the loaded pallet is made available for unloading at the same time that the empty mold is returned to the filling position. Conversely, motion of the mold to the stripping position is accompanied by a corresponding motion of the pallet to a position beneath the filled mold.

It is another object of this invention to provide a compact and inexpensive drive mechanism for these mold and pallet movements.

It is still another object of this invention to provide a simple and inexpensive measuring hopper for the plastic material.

As heretofore stated, after the mold has been filled, it is moved off the bottom plate, which remains in its position on the vibrator. Then, after stripping the mold, it is returned to a position over the plate. In this position the mold is clamped against material relative movement with respect to the plate.

It is still another object of this invention to provide means that automatically holds and releases the mold as the mold is respectively moved to a position over the plate, and to a stripping position.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 2 is an enlarged sectional view of the molding station, illustrating the mold in place and ready for pouring and vibration;

Fig. 7 is a view, partly in section, taken along a plane indicated by line 7—7 of Fig. 1, and illustrating the stripping mechanism;

Fig. 8 is a horizontal section, taken alone a plane indicated by line 8—8 of Fig. 7;

Fig. 9 is an enlarged plan view, taken from a plane above the unloading apparatus and partly broken away;

Fig. 10 is an enlarged sectional view, taken along a plane indicated by line 10—10 of Fig. 1;

Figure 1:
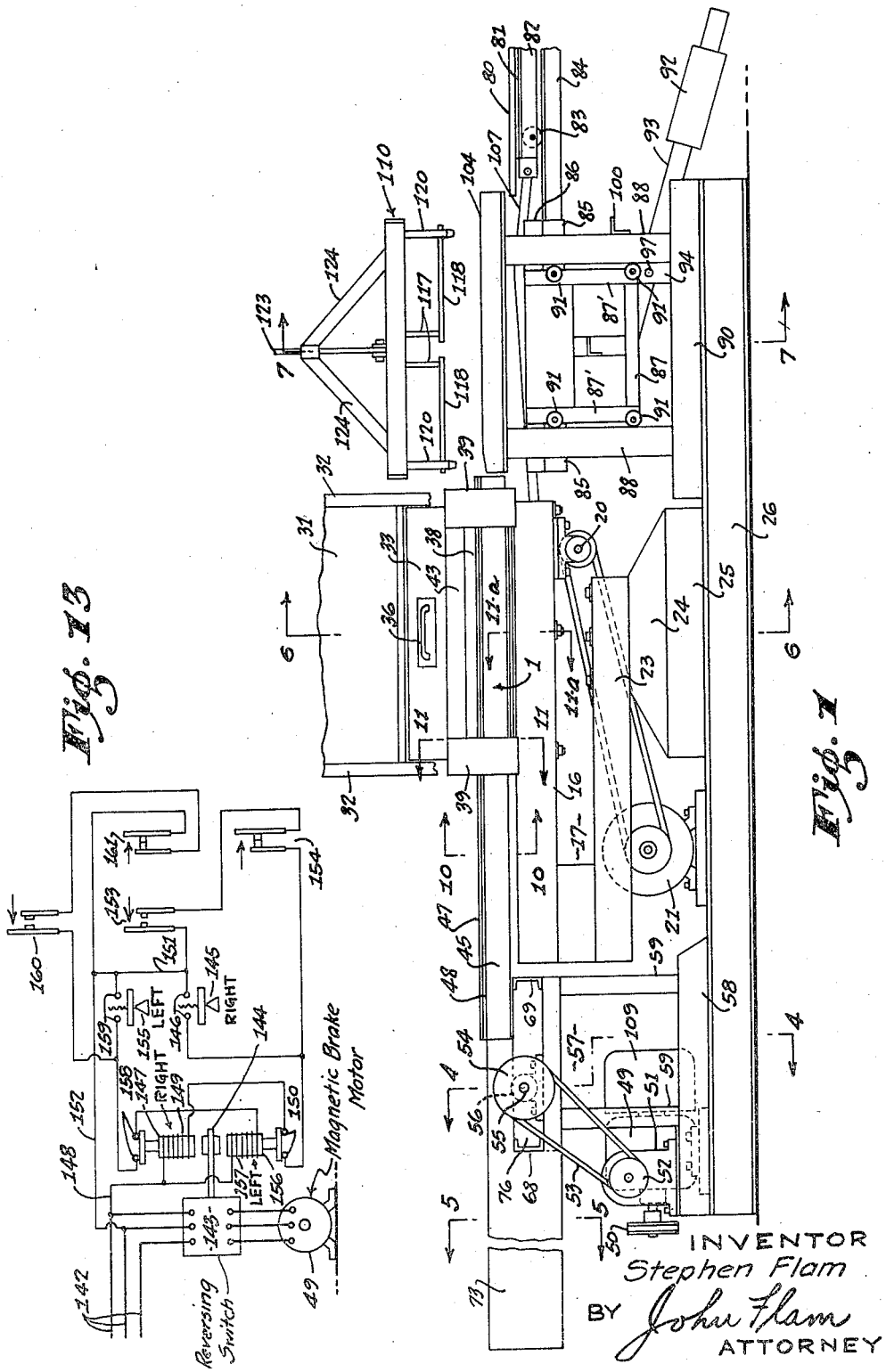
Figure 1 is a side elevation of an apparatus incorporating the invention, some of the parts being broken away to reduce the length of the figure.

Figs. 11 and 11a are enlarged fragmentary sectional views, taken along planes respectively indicated by line 11—11 and 11a—11a of Fig. 1;

Fig. 12 is a sectional view, partly broken away, taken along the plane corresponding to line 12—12 of Fig. 11;

Fig. 13 illustrates an electrical control system that may be used with the invention;

Fig. 14 is a view, similar to Fig. 1, of a form of the invention that utilizes a hydraulic control system;

Fig. 15 is a fragmentary view, partly in section, of the stripper mechanism and pallet supporting mechanism utilized in connection with the apparatus of Fig. 14;

Fig. 16 is a fragmentary section, taken along a plane indicated by line 16—16 of Fig. 15;

Fig. 17 is an end view, partly in section, of the stripper and pallet supporting mechanisms;

Fig. 18 is a sectional view, taken along a plane indicated by line 18—18 of Fig. 17;

Fig. 19 is a diagram of a hydraulic control system utilized with the apparatus shown in Figs. 14 to 18;

Fig. 20 is a side elevation of the hydraulic control valve mechanisms shown in Fig. 19;

Fig. 21 is an enlarged elevation of one of the controls cooperating with a valve of Fig. 19;

Figs. 22 and 23 are sectional views, taken along planes indicated respectively by lines 22—22 and 23—23 of Fig. 21;

Fig. 24 is a sectional view, taken along a plane indicated by line 24—24 of Fig. 22, and illustrating an alternative position of the control apparatus;

Fig. 25 is a sectional view, taken along a plane corresponding to line 25—25 of Fig. 21; and Figs. 26 to 30 inclusive are diagrams of the hydraulic control system, showing different stages in the automatic and manual operation of the system.

In the present instance, the molding machinery is shown as adapted for the casting of concrete building blocks. For this purpose, a mold structure I is provided. This mold structure can be best explained in connection with Figs. 2, 3, 6, and 9. It is shown as including a series of vertical walls dividing the mold structure, in this instance, into four block molds so that, in one operation, four concrete blocks can be cast. However, any desired shape or number of articles, such as brick or tile, may be cast.

The outer walls are defined by an angle iron frame 2 that may be formed of four separate angle irons appropriately attached, as by welding, to form a complete rectangular frame. The horizontal legs of the angle irons extend outwardly from the top edge of the molding space, and the upper surfaces of these angle irons correspond to the upper surface of the cast blocks while they are positioned in the mold.

Figure 2:
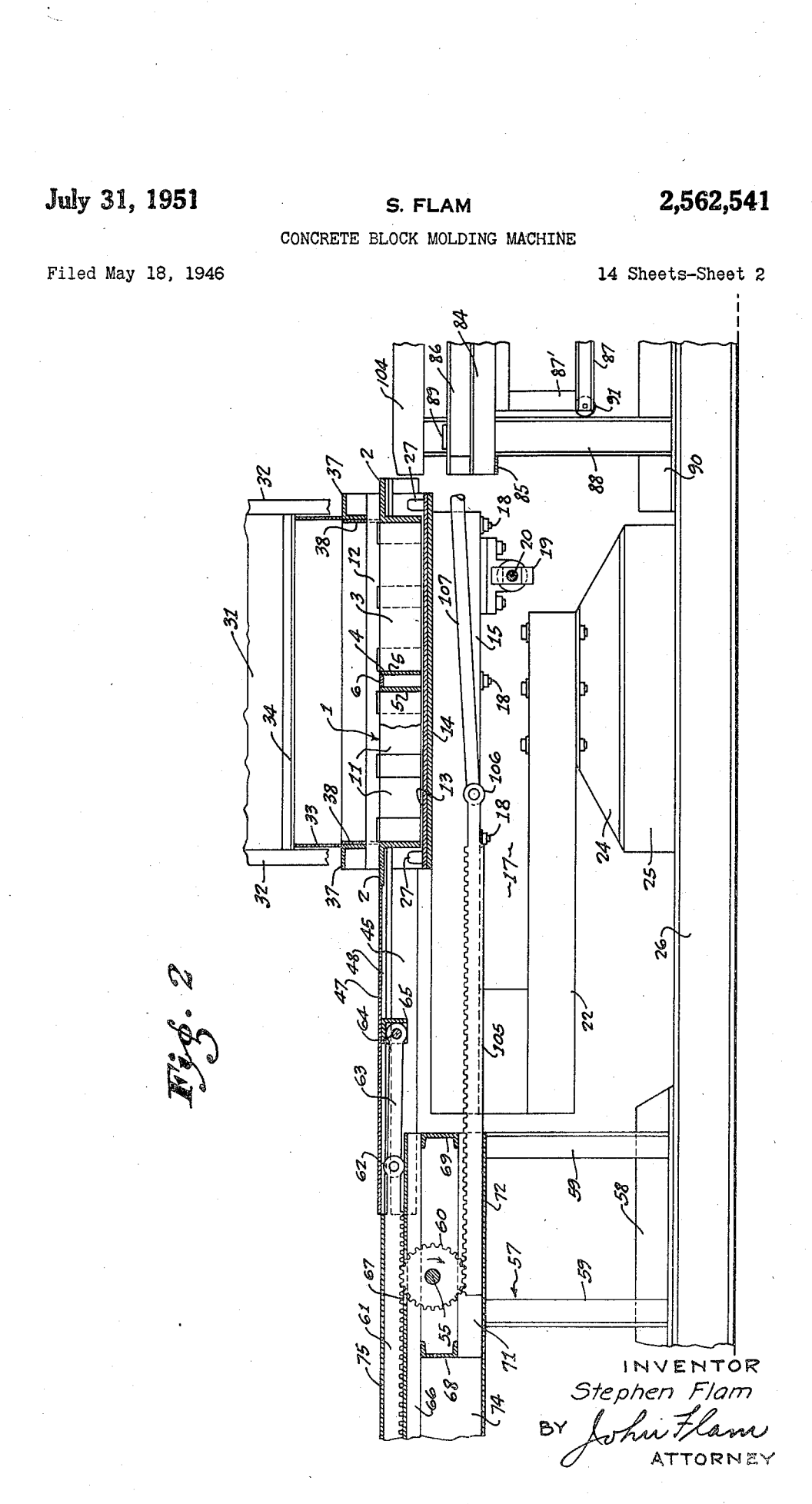
Figure 3:
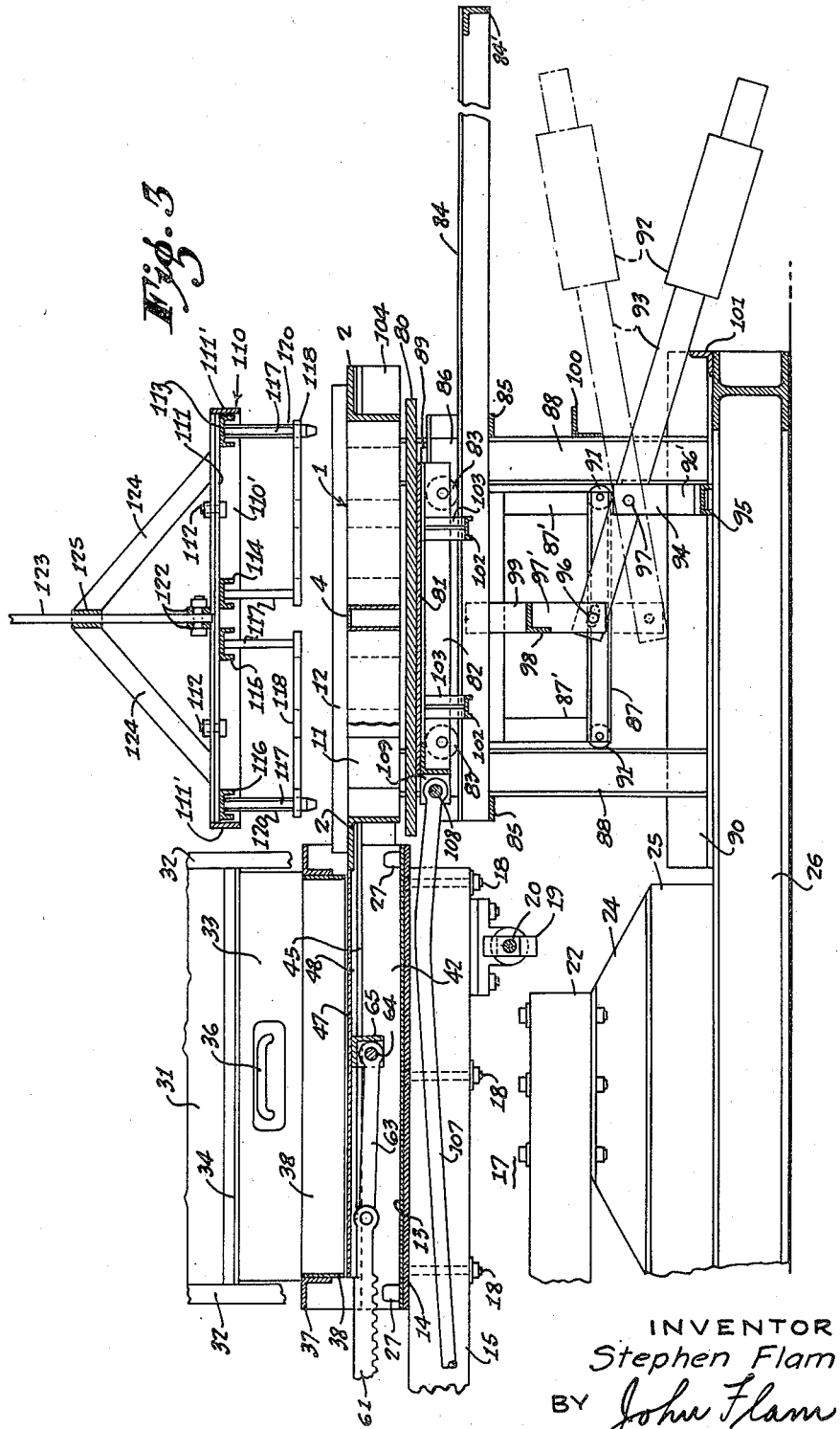
Fig. 3 is an enlarged vertical section of the apparatus, illustrating the mold in position for stripping.

Dividing the frame longitudinally is a plate 3 (Figs. 6 and 9); and dividing the two logitudinal spaces is a wall structure 4 (Figs. 2, 3, and 9). This wall structure 4 is formed in this instance by the aid of a pair of spaced parallel plates 5 extending the full depth of the mold space, and a plate or strip 6 joining the top edges of these plates.

By the aid of the wall structures 3 and 4, the four mold spaces 7, 8, 9, and 10 (Fig. 9) are formed.

Should it be desired to provide core holes in the cast blocks, cores 11 may be suspended within the mold spaces. These cores 11 are shown in this instance (Figs. 2, 3, 6, and 9) as supported by the core suspending bars 12. These bars 12 may be welded to the tops of the cores and may also be welded to the horizontal flanges of the frame 2, as shown most clearly in Fig. 2.

Since these bars extend above the molding spaces, as well as above the cores, they may restrict the free flow of concrete to the space immediately beneath these bars. In order to obviate this, the lower edges of the bars 12 (which are immediately above the empty mold spaces) are beveled, as shown most clearly in Fig. 6. In this way there is no interference with the free flow of concrete to the mold spaces immediately underneath the bars 12.

The mold bottom is formed by the plate 13. This plate 13, as shown most clearly in Figs. 6 and 11, rests upon a supporting plate 14 that is attached to the upper vibrating arms 15 and 16 of a vibrator mechanism 17 (Fig. 2). For this purpose, bolts 18 (Fig. 11a) are utilized.

The vibrator mechanism is described and claimed in an application filed on November 25, 1944, under Ser. No. 565,092, in the name of Stephen Flam, now Patent No. 2,446,818. Vibration is secured by the aid of unbalanced weights 19 (Fig. 6) mounted on a shaft 20 rotated by the aid of an electric motor 21 (Fig. 1). This motor is provided with a magnetic brake to ensure quick stopping when it is de-energized. The shaft 20 extends transversely of the upper arms 15 and 16 and near their free ends. The lower arms 22 and 23 are appropriately supported as upon the channels 24 disposed on the anchor blocks 25, in turn supported on the foundation beams 26. Although beams 26 are shown in this instance, any appropriate base or foundation for the machinery can be provided. In the present instance, these beams 26 are shown as extended so as to support the operating parts of the molding machinery (Fig. 1).

The bottom plate 13 for the molding structure is so arranged that it may vibrate freely in any direction. Thus, as shown most clearly in Figs. 2, 3, 6, and 11, pins 27 are provided which are attached to the supporting plate 14. There are four or more of these pins, one adjacent each corner of the mold structure; and they pass loosely through large clearance apertures 28 in the bottom plate 13. Due to this loose mounting of the mold and its bottom plate on the vibrating mechanism, the vibration of the mold is enhanced. Furthermore, due to the clearance between the restraining pins 27 and the apertures 28, the vibration is unidirectional, which ensures a more uniform compacting of the plastic material that is poured into the mold. Vibration of the mold structure is attained simultaneously with the supply of the concrete to the mold. The manner in which the plastic concrete is poured will now be described.

For this purpose a measuring hopper structure extends at one side of the apparatus. The hopper structure can be best explained in connection with Figs. 1, 3, and 6.

A support 29 (Fig. 6) with a flat upper surface 30 is arranged along one side of the mold structure. This surface 30 is somewhat above the top surface of the mold frame. Disposed immediately above the upper surface 30 is a chute 31, attached as by the aid of the supporting members 32 (Fig. 3) to the support 29. The lower end of the chute 31 is open. It is intended to pass the concrete mixture into a space formed by a member 33. This member 33 resembles a drawer without a bottom. When the member 33 is disposed in the dot-and-dash position indicated in Fig. 6, immediately beneath the chute 31, the concrete mixture is free to flow from the chute 31 to fill the space formed by the four walls of the member 33 and the surface 30. In order to confine the plastic material in this position, flanges 34 are provided at the lower edge of the chute 31 to overlie completely the top of the member 33. Furthermore, the member 33 is provided with an apron 35 that serves to close the chute 31 when the member 33 is pulled to the right to the full line position of Fig. 6. Thus, the measured quantity of material that had passed into the space formed by member 33 is moved to a position immediately above the mold 1.

The capacity or volume of the space formed by member 33 and surface 30 is designed to fill the mold spaces. Since the apron 35 closes the bottom of the chute 31, no excess material can drop onto the surface 30 while the member 33 is discharging through its open bottom. Accordingly, after the material has dropped through member 33 into the mold 1, the member 33 can be slid back onto the surface 30 for a new loading. In order to facilitate manual operation of the drawer-like member 33, a handle 36 is attached to the forward wall.

Figure 6:
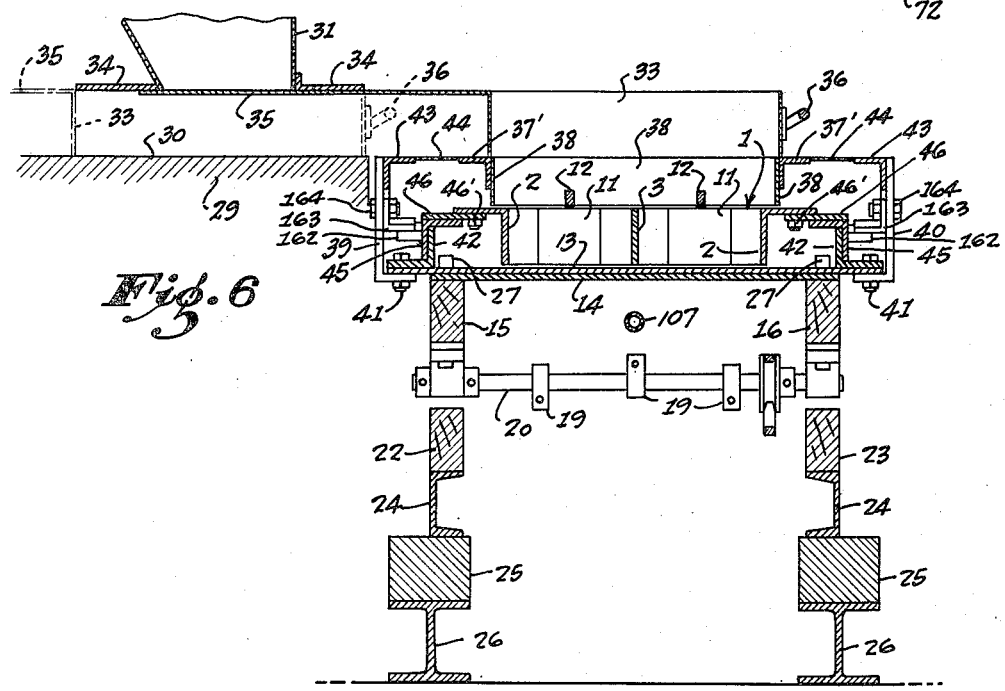
Fig. 6 is an enlarged cross section, taken along a plane indicated by line 6—6 of Fig. 1.

The bottom of the member 33 is above the level of the top of the mold 1, as shown most clearly in Fig. 6. In the discharging position the member 33 rests upon a structure interposed between the mold structure 1 and the member 33.

This structure comprises the angle irons 37 extending transversely of the apparatus, and the angle irons 37¹ that extend longitudinally of the apparatus. Attached on the inner faces of each of these angle irons is a plate 38 to form the rectangular space above the mold structure 1. The transverse angles 37 extend beyond the ends of the longitudinally extending angles 37¹, as shown most clearly in Fig. 11. The frame formed by angles 37 and 37¹ and the plates 38 are supported on loose plate 13 by the aid of the angles and plates illustrated most clearly in Figs. 1, 6, 11, and 12.

Thus, fastened to the mold bottom 13 at its opposite edges are the vertical brackets 39, 40, four such brackets being utilized. The fastening bolts 41 for these brackets also serve to attach the angle irons 42 that extend along the opposite edges of the plate 13 and which serve, as hereinafter to be described, to support the mold structure 1. Attached transversely between the series of brackets 39 and 40 are the angle irons 43. The upper legs of the angle irons 43 are aligned with the upper surfaces of the angle irons 37 and 37¹, and are attached thereto as by the strips 44, by welding, bolting, or riveting.

The angles 37 and 37¹, strips 44, angles 43, and brackets 39 and 40 may appropriately be secured to each other, as by welding.

The mold structure 1 is supported and slidably guided upon the vertical legs of angles 42. For this purpose there are provided angle irons 45 (see, also, Fig. 9) that extend along the sides of the mold structure 1. The vertical legs of these angle irons are disposed adjacent the vertical legs of the angle irons 42. The tops of the vertical legs of the angle irons 42 serve as a support for the horizontal legs of the angle irons 45, as shown most clearly in Fig. 11. Fastened as by welding to the horizontal legs of the angle 45 is a supporting plate 46. The horizontal legs of the angles 2 of the mold frame are detachably attached thereto as by the flat head bolts 46'. As will be hereinafter described, it is possible to remove the mold structure 1 when it is moved away from the molding position by removal of bolts 46'.

In order to permit the mold structure to move to the right from the molding position of Fig. 1 to the stripping position of Fig. 3, the plates 38 that are transverse to the mold are slotted for the passage of the core supporting bars 12 (Fig. 6). Furthermore, this movement to the right causes the top of the mold to be struck off by the lower edges of these transverse plates 38. This striking off occurs automatically upon movement of the filled mold to the stripping position of Fig. 3.

The angle irons 45, which serve as a support for the supporting plates 46, are extended to the left beyond the mold structure 1, as shown most clearly in Fig. 9. These angle irons serve to support an apron plate 47 which may be made of sheet metal and which has an upper surface aligned with the upper level of the mold structure. Spacer strips 48 (Fig. 10) are disposed between the angle irons 45 and the apron 47 in order to raise the level of the plate 47 to the desired point.

Figure 4:
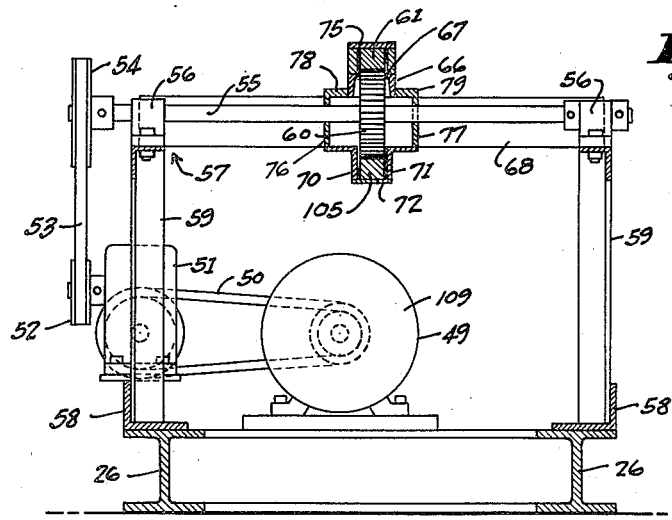
Fig. 4 is an enlarged cross section, taken along a plane indicated by line 4—4 of Fig. 1.

During the period of molding, the motor 21 (Fig. 1) is energized by appropriate remote control switches. When this molding operation is completed, the mold 1 is moved to the stripping position of Fig. 3. This movement can be accomplished either manually, mechanically, or by fluid pressure. In the form shown in Figs. 1 to 13, an electric motor 49 is utilized for this purpose (Figs. 1 and 4). This electric motor 49 is supported appropriately upon the framework 26 and is connected, as by a belt 50, to a transmission mechanism 51 that reduces the speed of the motor to an appropriate value. The output pulley 52 of this transmission is connected, as by a belt 53, to a pulley 54 that operates a rack and pinion mechanism. The pulley 54 is shown as mounted for this purpose on a transverse shaft 55 appropriately supported in bearing standards 56. These bearing standards 56 are supported on a frame 57. This frame 57 is mounted on the I-beam 26 as by the aid of the angle irons 58 and the upright angle irons 59, as well as by any other appropriate braces.

Figure 5:
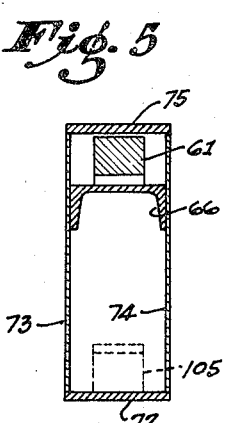
Fig. 5 is an enlarged cross section, taken along a plane indicated by line 5—5 of Fig. 1.

Supported on a shaft 55 is a gear 60 (Fig. 2) which meshes with an upper rack 61 (see, also, Fig. 5). This rack 61 has an ear 62 at its right-hand side, as shown most clearly in Fig. 2. To this ear is pivotally connected a link 63. The right-hand end of the link is pivoted on a cross pin 64 supported in a bracket 65 attached to the lower side of the apron plate 47. When the gear 60 rotates in a clockwise direction, as viewed in Fig. 2, the mold structure 1 is moved toward the right. Reverse rotation causes the mold structure 1 to be moved toward the left. In the position of Figs. 1 and 2, the mold structure has been moved toward the left to the position for molding. In the position of Fig. 3, the mold structure has been moved by the rack and pinion mechanism to the right in the position to be stripped.

The rack 61 is supported on top of the channel iron 66 that extends longitudinally along the center line of the apparatus. The lower surfaces of the teeth of rack 61 rest on the iron 66, as shown most clearly in Figs. 2 and 5. Furthermore, as indicated in Figs. 2 and 4, the channel iron 66 has a slot 67 therein to permit meshing of the gear 60 with the rack 61.

The channel iron 66 is attached to the top flanges of the spaced parallel channel irons 68 and 69 that are supported transversely on the frame 57.

In order to provide a housing for the rack and pinion mechanism, use is made of the angle irons 70 and 71 extending longitudinally of the apparatus. The angle irons are supported underneath the transverse channels 68 and 69, as shown most clearly in Figs. 2 and 4. A lower plate 72 extends under the vertical legs of the angles 70 and 71. Supported at the top edges of the horizontal legs of these angles project the parallel spaced plates 76 and 77. These plates are appropriately apertured for the passage of the shaft 55. They are connected to the channel beam 66 as by the strips 78 and 79.

In order to complete an enclosure for the gear 60 (Figs. 1, 4, and 5), a supplemental housing is provided by the aid of the side plates 73 and 74, and top plate 75.

The stripping position of the mold structure 1 is indicated in Fig. 3. In this position a filled mold has been moved off the loose bottom plate 13 toward the right, and immediately above a pallet 80 (see, also, Fig. 7). Although in moving the mold structure 1 off the bottom plate 13, there is no positive restraint against downward movement of the cast blocks out of the mold, yet the period of motion to the stripping position is so short and the plastic material is such that the cast blocks remain, by adhesion, within the mold.

The stripping of the mold onto the pallet 80 is accomplished by the aid of mechanism illustrated most clearly in Figs. 1, 3, and 7.

The pallet 80 is so arranged that, when the blocks are disposed on the pallet 80, it is urged downwardly by the weight of the blocks, so that the loaded pallet 80 may be moved to an unloading position to the right of the mechanism.

For this purpose the pallet 80 rests upon a carriage structure. This carriage structure includes a table 81. Sets of spaced angle irons 82 extend from below table 81 and adjacent the longitudinal edges of the table. These angle irons, shown most clearly in Fig. 7, accommodate shafts for the rollers or wheels 83 of the carriage. These rollers or wheels are free to roll on the horizontal flanges of the rails formed by beams 84. These beams extend for a substantial distance to the right, where the carriage may be rolled after it is loaded, for unloading the pallet 80. These T beams may be joined at their right-hand ends by a cross angle iron 841 (Fig. 3). The rails 84 are suspended on a vertically movable frame. For this purpose the rails 84 are joined, as by the strips 85, to the angle irons 86 at each side of, and above, the rails. These angle irons in turn extend longitudinally along the upper portion of a vertically movable structure. The lower portion is formed by a pair of channel irons 87 joined to the angles 86 as by the vertical structural elements 88. Movement of the vertically movable structure is guided by the plates 89 that extend into the channels formed by the upright channel irons 88, and attached to the top of the angles 86. The angles 90 serve to anchor the irons 88 to the base structure 26. Further to guide this structure, a plurality of rollers 91 may be provided on the vertically movable structure for contacting the sides of the channels, as illustrated in Figs. 1, 3 and 7.

Downward movement of this structure, which supports the rails 84, is counter-balanced by appropriate means, such as weights 92, so that, when the pallet 80 is empty, the vertically movable structure is urged by the weights upwardly to the receiving position of Fig. 3.

These weights 92 are shown most clearly in Figs. 3 and 7. Two of these weights are shown in the present instance; and they may be adjustably mounted upon a lever arm 93 which is pivoted on a standard 94. This standard 94 is supported transversely of the frame 26 by appropriate structural elements, including the transverse channel iron 95 and the angle irons 96¹. A pivot pin 97 extends through the standard to form an appropriate support for the lever 93.

The shorter end of the lever is slotted for the accommodation of the pin 96. This pin 96 is arranged transversely of the standard 97¹ supported on a transverse angle iron 98. This angle iron 98 in turn is attached to the vertical legs of the rails 84 as by the strips 99. Appropriate stops may be provided for the loaded and unloaded position of the lever 93. For example, a transverse angle iron 100 (connecting channels 88) may serve to limit the downward movement of the vertically movable structure. A corresponding angle iron 101 serves to limit the upward movement of the structure.

In order to guide the carriage that supports the pallet 80 and to restrain it against material misalignment, a pair of small channel irons 102 extend transversely of the carriage and between the vertical legs of the rails 84 (Fig. 3). The channel irons may be appropriately supported as by the T irons 103 upon the inner angles 82.

In order to lend further rigidity to the means supporting the pallet carriage and the vertically movable structure, angle irons 104 (Figs. 1, 2, and 3) are arranged to extend over the tops of the beams 89. These angles, furthermore, form continuations of angles 42 (Fig. 6) to provide a mold support during the stripping process. The mold structure 1 slides onto the angles 104.

Movement of the carriage table 81 to a position beneath the filled mold (as shown in Fig. 3), as well as movement of this carriage to the unloading position of Fig. 1, is accomplished by the aid of a rack 105 (Fig. 2) that is in mesh with the gear 60. This rack is arranged diametrically opposite the rack 61. It is provided with an ear 106 and a link 107. The right-hand end of the link 107 is joined, as shown most clearly in Fig. 3, to a pivot pin 108 that is supported in the clevis 109 attached to the left-hand portion of the carriage table 81.

As shown most clearly in Figs. 2 and 4, the rack 105 is appropriately housed in the housing structure provided for the gear 60 and rack 61, and it is located between the vertical legs of angles 70 and 71.

Movement of the gear 60 in a clockwise direction from the position shown in Fig. 2 will move the mold structure 1 toward the right and into the position of Fig. 3. At the same time the rack 105 is moved to the left and causes the pallet table 81 to move toward the left immediately beneath the mold 1. A counter-clockwise rotation of gear 60 is effective to cause the pallet 80 to move to the unloading position of Fig. 1, and the mold 1 to the molding position.

In order to provide a quick stop for the motor 49 that operates the gear 60, a magnetic brake structure 109 (Fig. 1) may be provided for the motor 49. Similarly, a magnetic brake may also be applied to the motor 21 that serves to drive the vibrator mechanism.

The stripping operation is performed by a stripper mechanism shown to best advantage in Figs. 3, 7, and 8.

This stripper mechanism includes a frame 110. The longitudinal edges of the frame are formed of angle irons 110'. Plates 111 are attached as by the bolts 112 to the horizontal legs of the angle irons. The transverse edges of the frame 110 are formed by the plates or strips 111'. Transversely supported on the bottom of these plates 111 are a number of spaced channel beams 113, 114, 115, and 116. These beams in turn support the vertical rods 117 extending downwardly from the frame 110. These rods 117 carry stripper plates 118 corresponding in form to the upper surface of the molded block. These plates are generally E-shaped (Fig. 8) and are spaced to provide passages 119 for the core-suspending bars 12.

Accordingly, when the frame 110 is urged downwardly, the plates 118 contact the top surfaces of the blocks and they may be urged out of the mold and onto the pallet 80.

In order to provide accurate register between the plates 118 and the mold structure, four or more guide pins 120 are provided respectively adjacent the corners of the frame 110. These guide pins are adapted to enter corresponding guide apertures 121 (Fig. 9) in plates 46.

A vertically movable support is provided for the frame 110. For this purpose spaced parallel plates 122 (Figs. 7 and 8) are disposed transversely across the top of the frame 110, and are appropriately attached thereto. Centrally thereof a bar 123 extends upwardly. Diagonal braces 124 are joined to the bar, as by the aid of the collar 125.

The bar 123 is vertically guided in the bracket 126 (Fig. 7). This bracket 126 is firmly supported on a vertical pipe 127 located at one side of the mechanism. A similar vertical guide bracket 128 is provided at the upper end of the pipe 127.

A hand operating lever 129 is pivoted, as by a pin 130, to the bar 123 and intermediate the brackets 126 and 128. Its left-hand end is mounted on a stationary pivot 131, adjustable in a vertical slot 132 of an upright bracket 133 joined to the lower bracket 126. The bracket 133 is pivotally supported, as by the pivot pin 134, to permit the pivot 131 to move in an arc.

A supplemental limiting guide 135 is provided intermediate the pivot 130 and 131. This guide is provided with a guide slot 136 for a pin 137 mounted on the lever 129. The limits of movement of the lever 129 are determined by the slot 136. Guide 135 is also pivotally mounted on bracket 126.

In order to provide a counter-weight that will cause movement of the stripper frame 110 upwardly when the lever 129 is released, the bar 123 carries at its upper end a link connection 137'. This link connection is coupled to a counter-weight lever 138 pivoted on pin 139. This pin 130 is supported on the arm 140 joined to the bracket 128. The left-hand end of lever 138 has a suspension 140' (such as a wire, rope, chain, or linkage) for a counter-weight 141, disposed in the hollow column 127.

In the form just described, the movement of the mold structure 1 and the pallet carriage supporting the pallet 80 is accomplished by power supplied by the electrical motor 49. The manner in which this motor 49 may be reversed and stopped is illustrated by the aid of Fig. 13.

The motor 49 is shown, in this instance, as supplied from the mains 142 through a reversing switch 143. Reversing of the switch may be accomplished in any convenient manner, as, for example, by the aid of an arm 144. In the neutral or intermediate position shown, the motor 49 is de-energized.

When it is desired to move the mold structure 1 to the right, or to stripping position, and the pallet 80 to a corresponding block receiving position, the "right" push-button 145 may be temporarily pushed. This causes a bridging of the contacts 146, and a solenoid 147 is energized to cause the arm 144 to move upwardly. The circuit for solenoid 147 may be traced from one of the mains 142, connection 148, coil 149 of the solenoid 147, contacts 150, button 145, and connections 151 and 152 back to another main 142.

The contacts 146 are bridged by a pair of limit switches 153 and 154 placed in series. Limit switch 153 is open when the mold 1 approaches its extreme left-hand, or casting, position, and limit switch 154 is arranged to be disconnected when the mold 1 approaches its stripping position.

While the mold is traveling between the two positions, both switches 153 and 154 are closed. Accordingly, after the mold is started on its motion toward the right, the push-button 145 may be released, and the coil 149 remains energized until limit switch 154 opens. This occurs when the mold 1 is in the stripping position of Fig. 3. These limit switches may be operated by appropriate stops mounted on the moving support for mold structure 1.

In order to start the mold movement back toward the left toward molding position, and to move the pallet 80 to the unloading position after the stripping operation is accomplished, the "left" push-button 155 is pushed. This completes the circuit for the left solenoid 156, pulling the arm 144 downwardly to cause the motor 49 to be energized in the reverse direction.

The circuit for solenoid 156 may be traced as follows: Connection 148, coil 157 of solenoid 156, contacts 158, push-button contacts 159 and connections 151, 152 back to another main. As before, the push button contacts 159 are paralleled by the limit switches 160 and 161 in series. Limit switches 153 and 160 may be operated by the same mechanism when the mold 1 reaches its extreme left-hand position. Similarly, limit switches 154 and 161 may be operated by the same mechanism when the mold 1 reaches its stripping position.

As soon as limit switch 161 closes, due to movement of the mold 1 toward the left, and away from stripping position, the push-button 155 may be released. The circuit for the solenoid 156 stays completed until limit switch 160 opens. This occurs when the mold structure 1 reaches casting position.

Contacts 150 are controlled so as to open when the "left" solenoid 156 is energized; and contacts 158 are arranged to be opened when the "right" solenoid 147 is energized. These contacts are necessary to ensure that only one of the solenoids can be energized while all of the four limit switches are closed, which occurs when the mold and pallet are in transition.

The mode of operation of the apparatus shown in Figs. 1 to 13 may now be briefly described.

Assuming that the mold 1 and pallet 80 are in the position shown in Fig. 1, and neither of the push-buttons 145 or 155 is operated, the motor 49 is at rest, and limit switches 153 and 160 are open. In this position the vibrator motor 21 is energized. A measured quantity of concrete is loaded into the mold by the aid of the measuring container 33 in the manner illustrated in Fig. 6. After the mold has been filled and sufficiently vibrated, motor 21 is de-energized. It stops quickly, due to magnetic braking. The right button 145 is now pushed for a short interval. This causes energization of the motor 49 to move the mold 1 to the right. During this movement the top of the mold is struck off by plate 38 (Fig. 3). The apron 47 then moves into position corresponding to the top surface of the mold. Motor 49 is de-energized by opening of switch 154. The motor stops quickly, due to magnetic braking.

At the same time, the pallet 80 has moved toward the left to the position of Fig. 3. The stripper mechanism can then be operated by the aid of the lever 219. The extruded blocks impose a weight on the pallet 80, and the vertically movable structure 87, 88 moves downwardly and carries with it the table 81 on the T-rails 84. The weight 92 is so adjusted that the blocks move sufficiently downwardly to clear the bottom of the mold.

Then the left push button 155 is operated. This energizes the motor 49 in a reverse direction. The mold 1 and pallet 80 are moved to the starting position of Fig. 1. This movement continues until limit switches 153 and 160 are opened. The pallet 80 can then be unloaded while the mold 1 is again filled with the concrete mixture. Any excess material that may have fallen on apron 47 while the mold 1 was in the stripping position is struck off by left-hand plate 38 and falls into the empty mold.

If it be desired to change the mold, this can be accomplished while the mold 1 is in the position of Fig. 3. Bolts 46', shown most clearly in Fig. 11, can be removed and a different mold substituted.

It is necessary to ensure that the mold structure 1 will be urged tightly against the guide angles 42 (Figs. 11 and 12) during molding. For this purpose a wedging lock is provided which may be best described in connection with Figs. 6, 9, 11, and 12. Thus, adjacent the four corners of the mold supporting angles 45, are attached the inclined projections 162. The upper surfaces of these inclined projections are adapted to contact with corresponding inclined surfaces formed on the brackets 163 that are attached to the brackets 39, 40 as by the aid of bolts 164 that pass through slots in the bracket 163. In this way, an adjustment of the slanting surfaces may be effected.

The contacting surfaces between brackets 163 and the inclined projections 162 are at different levels at the left- and right-hand sides of the mold 1, as shown most clear in Fig. 12. Due to this arrangement the slanting projections 162 at the left-hand side of the mold structure can clear the bracket 163 that cooperates with the right-hand slanting projections 162.

In the position of Figs. 1 and 2, the wedging action between the slanting surfaces is sufficient to hold the mold structure 2 firmly to the vibrating mold plate 13. However, this clamping effect is nullified upon even the slightest movement of mold 1 to the right.

The mold structure and the pallet can be moved by other than electrical means. In the form shown in Figs. 14 to 30, there is shown a hydraulic or fluid pressure system for causing the relative motion of the mold and pallet, as well as for performing the stripping operation. Thus, the mold structure 1, shown in Fig. 14, is connected to a rod 165 (see, also, Fig. 19). Connection may be accomplished, for example, by the aid of a clevis 166 carried by the angle 167 supported appropriately underneath the apron 47. In this way, this connection does not interfere with removal and replacement of the mold structure when it is in the stripping position.

Pivotally connected to the clevis 166 there is an ear 168 that is fastened to the stem 165. The stem 165, as shown most clearly in Fig. 19, is connected to a piston 169 operating in a cylinder 170. The cylinder 170 may be appropriately supported by the aid of the framework (for example, on the horizontal beam 217), and has heads 171 and 172 providing fluid pressure connections 173 and 174 on opposite sides of piston 169.

To move the stem 165 to the right, fluid under pressure is admitted through connection 173, and fluid is removed from the cylinder 170 through connection 174. Similarly, to move the piston 169 to the left, fluid under pressure is admitted through connection 174 and discharged through connection 173.

A similar cylinder and piston arrangement is provided for moving the pallet carriage 175 shown in Figs. 15, 16, and 17. For this purpose piston rod 176 is coupled to a hollow link 177 (Fig. 14) slidably mounted in a collar 178. This collar is mounted on the frame structure as by the aid of the angle 179.

As before, the stem 176 is connected to a piston 180 operating in a cylinder 181. This piston and cylinder arrangement is similar to that provided for the mold, and is supported in a similar manner. It is also provided with the heads 182 and 183 having fluid pressure connections 184 and 185 leading to the cylinder space on opposite sides of the piston 180.

In this instance, the stripper mechanism 186 (Figs. 15 and 17) is likewise adapted to be hydraulically operated so as to move the stripper plates 118 in a vertical direction. The stripper structure proper is substantially the same as that described in connection with the Figs. 7 and 8. However, it is supported in this instance by the aid of a pair of parallel vertical channel beams 187 supported on the main I beams 26. These vertical channel beams are surmounted by a cross beam structure 188. This beam structure 188 serves as a support for the vertical cylinder 189, provided with a piston 193 and a rod 190 that is operatively connected to the stripper 186. Fluid pressure connections 191 and 192 are provided at the opposite ends of the cylinder structure, as shown most clearly in Fig. 19. These fluid pressure connections connect to the cylinder 189 on opposite sides of the piston 193.

By appropriate manual operation of control valves, it is possible to raise and lower the stripper mechanism 186, as well as appropriately to position the mold structure 1 and the pallet carriage. In the present instance, the valve controls are so arranged that the acts of molding and stripping occur in sequence once the cycle is started by manual operation.

To facilitate this automatic operation, a slightly different form of pallet carriage is utilized, and this will now be described in connection with Figs. 15, 16, 17, and 18.

Thus, the carriage includes the vertical, spaced channels 194. These channels are joined at the bottom by the transverse angle iron 195, and are similarly joined at the top of angle iron 186. A rectangular frame is thus formed. This rectangular frame is also braced by a transverse angle iron 197 to which the link 177 is appropriately attached as by the aid of the clevis 198 and the pin 199.

Extending from the sides of the frame are the angle irons 200. These angle irons are firmly attached to the vertical channels 194 and serve to support rollers 201. These rollers 201, as shown most clearly in Fig. 17, are accommodated in the channel beams 202, appropriately supported on the base 26 and columns 187. The carriage framework thus can roll in a horizontal direction, as viewed in Fig. 15.

If desired, a triangular brace 203 (Figs. 15 and 16) may be disposed between the angle iron 200 and the upright channels 194 of the rolling carriage or frame.

The carriage supports a vertically displaceable pallet table or support 204. This support may be appropriately fabricated from an angle iron frame 205 and an apron 206. The pallet proper 207 can rest upon the table 204.

This table may be urged by spring pressure or otherwise in a vertical direction. For this purpose its longitudinal edges support a pair of vertical angles 208. Each angle 208 has a long leg which overlies the open side of the corresponding channel 194, as shown most clearly in Fig. 16. These vertical legs provide supports for the spaced rollers 209 operating in the channels 194. Further to brace the pallet table 204, a pair of struts 210, one at each side of the frame, are provided. These struts are joined to the ears 211 mounted on the vertical legs of channels 208. At the upper ends of the braces, ears 212 are carried, and connect to the frame 205.

A pair of compression springs 213 are mounted on posts 214 to urge the table 204 upwardly with respect to the channel guides 194. Thus, the posts 214 are joined at their ends respectively to the upper and lower angle irons 195 and 196 (Fig. 18). The springs 213 operate on the horizontal flange 215 formed on angle 216 attached to the left-hand edge of the frame 205.

In order to support the cylinders 170 and 181, as well as to provide sufficient rigidity to the striker mechanism, horizontal channel irons 217 extend substantially the full length of the apparatus. These channel irons also appropriately form a support for the angle irons 218 (Fig. 17) upon which the mold structure 1 may rest when it is in stripping position. These angle irons are shown to best advantage in Figs. 14 and 17. An end angle iron 219 (Fig. 17) may also be utilized.

The control apparatus for the three cylinders 170, 181, and 189 is illustrated diagrammatically in Fig. 19, and in somewhat greater detail in Figs. 20 to 30 inclusive.

In the present instance, the fluid under pressure is oil, in which the required pressure is secured by the aid of a pump 220. This pump passes liquid under pressure through a relief valve 221 and, by way of conduits 222 and 223, to the control valves 224 and 225. These control valves may be of conventional construction, and are illustrated diagrammatically in each of the Figs. 26 to 30 inclusive. The description of the mode of operation of one of them can serve as a description of both.

Thus, as shown clearly in Fig. 26, the fluid pressure connection 222 leads into a cylinder space 226. This cylinder space is disposed between the pistons 227 and 228, both rigidly mounted on a stem 229. The cylinder space to the left of piston 227 and the cylinder space to the right of piston 228 are both connected to the return conduit 230 leading to the sump 231 (Fig. 19). This sump is connected to the intake of pump 220. The port 232 of valve 224 is connected to the conduit 191; and port 233 is connected to the conduit 192. Accordingly, in the central position of Fig. 26, the cylinder space 226 is sealed by the pistons 227 and 228 which cover the ports 232 and 233.

Movement of the stem 229 to the right to the position illustrated in Fig. 28 will cause a communication between connection 222 and port 232. Therefore, fluid under pressure can flow through connection 191 to urge the stem 190 downward for the stripping operation. At the same time, port 233 is uncovered to exhaust, permitting fluid from below the piston 193 to flow to the sump 231 through connection 192.

Accordingly, the stripper 186 moves downwardly to perform its stripping operation.

Figure 29:
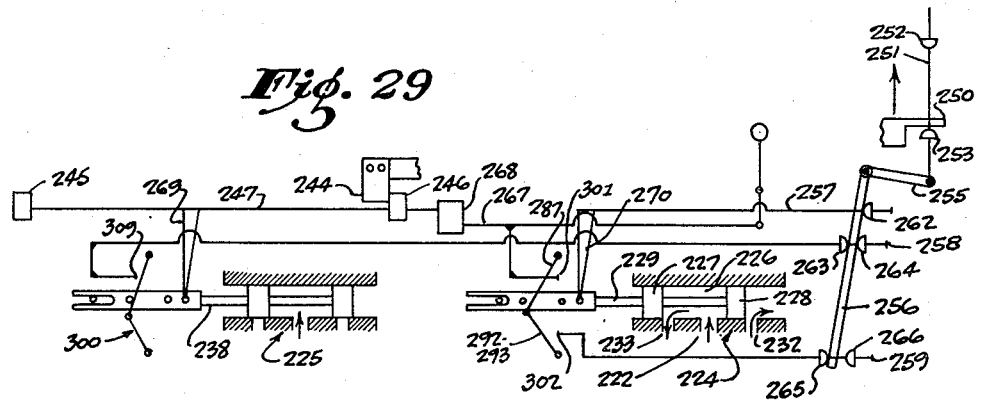

When the stem 229, however, is moved to the left a sufficient distance, the stripper 186 is caused to move upwardly since, in this position, as shown in Fig. 29, the port 233 is in communication with the pressure inlet 222; and port 232 is connected to the sump 231. Accordingly, the stripper mechanism is caused to move upwardly.

The control valve 225 is identical with the control valve 224. The connection 173 for the left-hand side of the cylinder 170 leads to the left-hand port 234; and the connection 184, from the left-hand end of cylinder 181, leads to the port 235. The conduit 174 permanently connects the right-hand ends of the cylinders 170 and 181.

When the valve 225 is in the neutral or central position of Fig. 26, both ports 234 and 235 are covered. In this position the spaces to the right and left of both pistons 169 and 180 and cylinders 170 and 181 are sealed off; and, accordingly, the pistons 169, 180 must remain stationary.

Thus, the cylinder space to the left of piston 169 (Fig. 19) is closed by the piston 236 of Fig. 26. Similarly, the cylinder space to the left of piston 180 is closed by the piston 237. The cylinder spaces to the right of pistons 169 and 180 are also closed; however, an adjusting mechanism incorporating control valve 239, as will be later described, connects to the closed spaces. In its neutral position, control valve 239 maintains these spaces sealed, as just described.

When the valve 239 is in such neutral position, the fluid to the right of pistons 169 and 180, having a constant volume, assures that, when piston 169 moves to the right, piston 180 must move to the left. This corresponds to the movement of the mold structure 1 toward stripping position, and the corresponding movement of the pallet table 204 toward the left into cooperating stripping position.

Accordingly, when port 234 of valve 225 is uncovered by movement of the valve stem 238 to the left (Fig. 27) fluid under pressure can flow through the space between pistons 236 and 237, and through conduit 173, for moving the stem 165 toward the right. At the same time, movement of piston 169 causes fluid under pressure to flow to the space to the right of piston 180 in cylinder 181, and rod 176 moves toward the left. The fluid in the space to the left of piston 180 is connected to the sump 231 through connection 184 and port 235.

Figure 30:
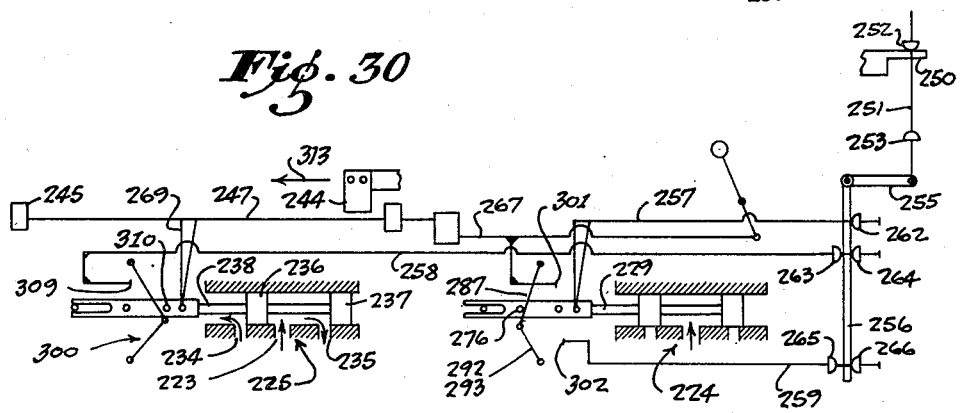

Similarly, as shown in Fig. 30, when the stem 238 is moved to the right, port 235 is connected to the pressure inlet 223, and fluid under pressure is permitted to flow through connection 184 to the left of piston 180. This causes a movement of piston 180 to the right to position the pallet table 204 to unloading position. By virtue of the connection 174, the piston 169 is simultaneously moved to the left, returning the mold structure 1 to the molding position. The space to the left of piston 169 is then connected to the sump 231 through the port 234.

Before proceeding with the automatic operation of the control valves 224 and 225, it is advantageous to describe the valve 239, by the aid of which the relative positions of pistons 169 and 180 (Fig. 19) may be independently adjusted.

Valve 239 has a stem 240 which is manually operable by hand lever 241. The valve 239 is similar in structure to the valves 224 and 225. There is a central pressure connection 241 from the pump 220. With valves 224 and 225 maintained in neutral position, the pistons 169 and 180 may be independently adjusted by the aid of the valve 239.

For this purpose a branch connection 242 leads from the space to the left of piston 169, and a similar branch connection 243 leads from the space to the right of pistons 169 and 180. These connections lead to ports in valve 239. When the valve 239 is in neutral position, these branch connections are closed. However, movement of the stem 240 causes the piston 169 to move independently of piston 180. Thus, when the stem 240 is moved toward the left to form a connection to conduit 173 from pressure connection 241, the piston 169 is caused to move to the right, and the liquid urged out of the space to the right of piston 169 is returned to the sump 231 by the aid of connection 243. Piston 180 must remain stationary, since the space to the left of piston 180 is closed by valve 225.

Similarly, by moving valve stem 240 toward the right, fluid under pressure can enter connection 243 and the piston 169 is moved to the left. The space to the left of piston 169 being reduced in this movement, the fluid therein can pass to the sump 231 through the connection 242. As before, piston 180 stays stationary.

In this way, the relative positions of rods 165 and 176 may be very accurately set, so that the mold 1 and pallet table 204 correctly register when they arrive at the stripper mechanism.

Automatic operation of valves 224 and 225 is accomplished by the aid of push rods that may be automatically operated by the mold and stripper.

Thus, as shown most clearly in Fig. 20, the mold apron 47 carries an actuator 244 at its left-hand end. This actuator is arranged to contact and move the spaced collars 245 and 246 mounted on a control rod 247. This push rod is appropriately guided by guides 248 and 249 mounted on beam 217. When the mold structure 1 reaches the molding position, the control rod 247 is pulled toward the left to the position shown in Fig. 26. However, when the mold reaches the stripping position, the actuator 244 contacts the collar 246 and the control rod 247 is moved toward the right.

The mechanical connections from this control rod to the valve 225 will be hereinafter described.

A similar actuator device 250 (Figs. 20 and 26) is attached to the stripper mechanism. This may be in the form of an angle iron through which a control rod 251 extends. This control rod carries an adjustable upper stop collar 252 and an adjustable lower collar 253, as by being threaded on the rod 251. The actuator 250 is located between them and is appropriately apertured for the reception of the rod 251.

The lower end of the rod carries a clevis 254 that operates a bell crank lever arm 255. The other arm 256 of the bell crank lever cooperates with three control rods 257, 258, and 259, shown also in Figs. 21, 22, 23, and 24. These control rods may be guided in plates 260. These plates may be appropriately joined to a supporting plate 261 (see particularly Figs. 21 to 25) which, in turn, is mounted upon the horizontal channel 217.

Movement of the control rods 257, 258, and 259 is effected by the aid of stops or collars shown diagrammatically in Figs. 26 to 30, and shown on a reduced scale in Fig. 20.

Thus, control rod 257 is shown as having an adjustable stop 262 that is threaded on the rod 257. The crank lever arm 256 is made of an angle iron, and rod 257 passes through one of its legs. The stop 262 is disposed on the right side of the leg. Accordingly, it is only when the rod 251 is moved upwardly that it is possible for the crank arm 256 to move the control rod 257.

Rod 258 is controlled by the aid of spaced adjustable stops 263 and 264 extending on opposite sides of the arm 256, and threaded on rod 258. Accordingly, control rod 258 may be moved either to the right or left by movement of the control rod 251.

The control rod 259 is similarly provided with a pair of spaced adjustable stops 265 and 266. The spacing between stops 263 and 264 and between stops 265 and 266 is such as to permit a slight lost motion between the arm 256 and these stops. In the diagrams, Figs. 26 to 30, no attempt has been made to show the true spacing of the rods or the proportions of the arms 255 and 256.

Push rod 247 is positively connected with stem 238 of valve 225 as by the aid of an arm 269. Similarly, control rod 257 is positively connected to the stem 229 of valve 224 as by the aid of the arm 270. Since arm 270 is identical with arm 269, and since this arm 270 is shown in detail in Figs. 21 to 25, a description of the structure of arm 270 and its associated parts will serve as a description of the structure of arm 269.

Arm 270 has a horizontal portion 271 (Fig. 23) which extends through a slot 272 in the supporting plate 261. It is fixed to the push rod 257 by the aid of a pair of U-bolts 273 (Figs. 23 and 25). These U-bolts pass through spaced apertures in the horizontal portion 271 and encompass the rod 257.

The downwardly extending portion of arm 270 is connected as by cross pin 274 to a pair of spaced straps 275. These spaced straps are connected together by the aid of spacer collars 276 and 277, through which pass the bolts 278 and 279. The left-hand ends of the straps are slotted, as shown most clearly in Fig. 21, and a guide sleeve 280 passes through the slot. This guide sleeve is appropriately supported on the supporting plate 261, as, for example, by the aid of the bolt 281. Washers 282 and 283 are utilized adjacent the outside surfaces of the straps 275 so that movement of the straps is confined to a direction parallel to the surface of the plate 261.

These straps 275 are joined to the valve stem 229 of valve 224, as by the aid of the cross pin 284 passing through the straps 275 adjacent their right-hand end.

Thus, by longitudinal movement of the control rod 257, the stem 229 is moved in a corresponding manner.

A hand lever 285 may be provided for optionally operating stem 229. For this purpose it has its lower end provided with a clevis that embraces the end of the stem 229; and pin 284 also passes through this clevis. An intermediate portion of the lever is connected by a link 286 (Fig. 20) to the casing of valve 224. This hand lever can be rocked about the left-hand end of link 286.

The positive operating means for the stem 229 is identical with the means illustrated in Fig. 20 for operating the stem 238 for control of valve 225 by aid of arm 269. A supporting plate 288, similar to plate 261, is provided, as well as the straps 289 attached to the stem 238. These straps 289 are similarly guided to straps 275. The hand lever 290 serves as an optional means for controlling the movement of the mold structure and pallet.

As will hereinafter appear, for automatic operation it is essential that, at times, the valve stems be operated by means other than the arms 270 and 269. This, of course, can occur only when there is no positive restraint against the movement of rods 247 or 257. This additional mechanism associated with each valve structure is one that can operate through a lost motion connection. In the present instance, a toggle mechanism is disclosed which is spring-pressed to either of its two broken positions and which, in its broken positions, can exert a resilient force upon the straps 275 or 289. These toggle mechanisms are indicated only by single lines in the diagrams of Figs. 26 to 30.

The structure of these toggles can be explained in connection with Figs. 21, 22, and 25.

Thus, an upper toggle arm 287 is shown as pivotally mounted on a pin 291 supported upon the plate 261. This arm passes between the straps 275, as shown most clearly in Figs. 22 and 25. The lower toggle arm is comprised of two plates 292 and 293 disposed on opposite sides of the arm 287. A lower pivot pin 294 is provided for these arms, and supported on plate 261. Each of these arms has a through aperture at one end and a slot at the other end. Thus, the slotted end of plate 293 embraces the pin 294, and the apertured end of plate 292 is connected to the pin 294. A spacer collar 295 is disposed between the lower ends of the plates 292 and 293.

The upper ends of the plates 292, 293 embrace the toggle pin 296 that passes through the arm 287. This toggle pin can be in the form of a bolt over which the sleeves 297 and 298 may pass. These sleeves contact the opposite sides of the arm 287.

A compression spring 299 is disposed over the lower toggle arm formed by the plates 292, 293. Its upper end abuts the upper widened portion of the plate 293. Its lower end abuts the lower widened portion of plate 292. Accordingly, the spring resiliently urges the toggle mechanism to a broken position. This occurs whenever the toggle mechanism passes through a central straightened position. In other words, it forms an over-center mechanism. It is only necessary to break the toggle a little before the spring 299 acts to urge the toggle to completely broken position.

The upper arm 287 operates on the spaced collars 276, 277, carried by the straps 275, to operate the valve stem 229.

A similar toggle mechanism is provided for the valve 225, generally indicated by reference character 300 of Fig. 20.

The movement of toggle mechanism 287— 292—293 can be positively effected by the aid of either of two dogs 301 or 302. Dog 301 is mounted, as shown most clearly in Figs. 21 and 22, upon the control rod 267. This is accomplished by the aid of the U-bolts 303, which clamp the dog to the rod 267.

The dog 301 has an operating end 304 projecting upwardly that is in alignment with the pin 305 extending through the arm 287 and carried thereby.

Thus, when rod 267 is moved toward the right, as viewed in Fig. 21, the dog 301 ultimately contacts pin 305 and urges the toggle arm 287 toward the right. After the toggle is thus broken, as indicated diagrammatically in Fig. 24, the arm 287 contacts collar 277, and valve stem 229 is urged toward the right.

In the operation of the automatic system the dog 301 may be required, at times, to be lifted out of the way of pin 305; thus, even when dog 301 has moved to the right to break the toggle, it is nevertheless possible to move the rod 257 to the left without interference with the dog 301. Accordingly, provisions are made for lifting the dog 301 to the dot-and-dash line position of Fig. 22, and the full line position of Fig. 24, after the dog passes a position corresponding to the straightening of the toggle. In this position pin 305 is permitted to move toward the left, back to the position of Fig. 21, even when rod 267 that carries dog 301 is restrained from movement toward the left.

To accomplish this purpose use is made of a cam member 306, shown to best advantage in Fig. 24. This cam member 306 is bolted to the supporting plate 261, and has a sloping upper surface 306' in the path of dog 301. This surface urges the dog upwardly out of the path of pin 305, as shown in Fig. 24. The control rod 267 is long enough so that there is only a slight angular torsion on this rod occasioned by the lifting of the dog in this manner. The resilient force of torsion serves additionally to urge the dog against the cam 306. The elevated position of the dog 301 is shown in Fig. 24, where it has already urged the toggle toward the right and has moved up on the cam 306.

The dog 302 is supported, as shown most clearly in Figs. 23 and 24, on the control rod 259. This dog has a horizontal arm 307 that passes through a slot 308 in plate 261. When rod 259 is urged toward the left, as viewed in Figs. 21 or 24, it will contact the toggle mechanism adjacent the toggle pin 296 and will force the toggle toward the broken position of Fig. 21.

The valve mechanism 225 (Fig. 20) includes a dog 309, similar to dog 301. This dog is mounted on rod 258; but there is no equivalent to the return dog 302.

Operation of the automatic hydraulic system may now be described.

In the position shown in Fig. 26, both valves 224 and 225 are in neutral. In this position of the valves, the mold structure 1 is supported on the vibrator, and in position for molding. The toggle mechanism 287 is only partially broken to the left, and is prevented from moving stem 229 to the left because of the restraint imposed by arm 270 and stop collar 262. Toggle mechanism 300 is only partially broken to the right, and is prevented from moving stem 238 to the right by the restraint imposed by arm 269 and actuator 244 in contact with collar 245.

Dog 301 is elevated to the position of Fig. 24 by the cam 306, and is out of contact with the toggle arm pin 305. The dog 309 is similarly elevated.

The stripper mechanism is in elevated position, and the pallet table 204 is in a corresponding unloading position. This condition is maintained until molding and vibration are completed. Then the movement of the mold structure 1 to stripping position can be initiated by moving the hand lever 320 in a clockwise direction. This starts the mechanism by urging rod 267 and rod 247, which is connected thereto by the member 268, toward the left, and thereby operating stem 238 toward the left by the aid of arm 269. The toggle mechanism 300 has been moved to the broken position of Fig. 27 by operation of the right-hand collar 310 carried by straps 289 attached to stem 238. This mechanism 300 can move to the left, as shown, because dog 309 is in raised position. It does not, therefore, offer any opposition to the breaking of toggle 300 to the position of Fig. 27. Horizontal movement of the rod 267 toward the left causes corresponding movement of the dog 301 to the left, and it slides off the cam 306 and in alignment with pin 305. Valve 225 is now in such position that pistons 169 and 180 move in opposite directions, as heretofore explained.

Movement of operating handle 269 to the position of Fig. 27 thus initiates movement of the molding structure 1 and pallet table 204 to stripper position. It may be noted that toggle arm 287 cannot move stem 229 toward the left, since this stem 229 is still positively restrained by the arm 270 and the stop 262.

When the mold structure 1 arrives at the stripper position, the control elements assume the condition illustrated in Fig. 28.

Here collar 246 has been contacted by the actuator 244, returning rods 247 and 267 to the starting position. The control valve 225 again assumes the neutral position, and movement of the mold structure stops. Although toggle 300 has been moved slightly to the right by the collar 311 of stem 238, it has not yet reached its straightened position. Correspondingly, movement of the pallet table 204 also stops immediately underneath the mold structure.

The dog 301, however, moved toward the right by rod 267 to the same position as in Fig. 26, is effective to break the toggle arm 287 completely. This can occur because the arm 270 is not restrained by the stop 262 against right-hand movement. Accordingly, the toggle arm 287, operating the right-hand collar 277, has moved the stem 229 to the right. Such a movement permits fluid under pressure to flow through connection 222 and port 232 to connection 191, urging the stripper operating piston 193 downwardly. This is indicated by the arrow 312 in Fig. 28. Here dog 301 is again in elevated position.

Accordingly, the stripper begins to descend. At the end of its stroke, it contacts stop 253 and operates the bell crank arm 255. This movement of the arm 255 causes a corresponding movement of arm 256, causing a complete reversal of the position of the valve 224. This is accomplished by movement of control rod 259 toward the left and operation of the toggle arm 292, 293 by the dog 302 that is carried by the rod 259. The toggle accordingly moves stem 229 toward the left, and fluid under pressure is passed through the port 233 and connection 192 beneath the piston 193. This leftward movement is not restrained by dog 301, since this dog is elevated by the cam 306; nor is it restrained by arm 270, since collar 62 is on the right side of arm 256. The long rod 258 is moved toward the right by aid of the stop collar 263. This rod 258 carries the dog 309 and moves it free of the lifting cam to the position illustrated in Fig. 29.

In the position represented by Fig. 29, the stripper mechanism proceeds to move upwardly. When it has reached the upper position of Fig. 30, it has returned the arms 255 and 256 to neutral position. This causes rod 257 to be moved toward the right by aid of the stop 262, and the valve 224 returns to a neutral position. Accordingly, the ascent of the stripper mechanism is stopped. Furthermore, the dog 302 is also moved to its inactive position of Figs. 26, 27, and 28.

Stop 264 is also urged toward the right, causing movement of the rod 258 toward the right. Accordingly, the dog 309 serves to break the toggle 300; then it is urged upwardly out of the way of the toggle pin. The toggle 300 moves the stem 238 toward the right, which reverses the movement of the mold structure. Furthermore, rods 247 and 267 also have been moved toward the right by operation of the stem 238 through arm 269. Since arm 269 is connected to stem 248, rods 247 and 267 are moved to the right; but this movement produces no control function.

The mold structure proceeds to move toward the left, as indicated by the arrow 213. This motion continues until the mold structure reaches the position of Fig. 26. In this position the collar 245 has been moved toward the left, and has correspondingly moved control rod 247 and stem 238 to return the valve 225 to the neutral position of Fig. 26. In this position all motion stops. Although collar 310 has moved the toggle mechanism 300 toward the left, it is not moved far enough to break the toggle, and, accordingly, the control valve 225 remains in the neutral position.

In this position a succeeding operation of molding and vibrating can occur. When the operation of molding is completed, the lever 320 is again moved in a clockwise direction to start the cycle as explained in connection with Fig. 27.

Continued cycles can be initiated by operation of the handle 320 at the end of the molding period.

It is advantageous to energize the vibrator motor 21 (Fig. 1) for a limited time after the mold structure 1 reaches the molding position represented by Fig. 20. This can be accomplished by the aid of a pair of contacts 314, illustrated in Fig. 20, that are urged together by the mold apron 47 when it is in its extreme left-hand position. These contacts can initiate the action of a timer mechanism 315, connecting the mains 142 to motor 21. This mechanism is so arranged that, after a short interval upon the mold structure 1 reaching its molding position, the motor 21 is energized. The timer 315 then automatically disconnects the motor 21 after a predetermined interval. An auxiliary manual switch 316, shunting timer 315, may be provided, making it possible manually to control the motor 21 even after the timer operates. This may be desirable when the operator wishes to supplement the period of vibration produced automatically by the contacts 314.

Manually operable levers 285 and 290 may also be utilized instead of the automatic control by independent movement of the valve stems 229 and 238.

The inventor claims:

1. In a molding machine: a mold; a support for the mold upon which the mold is placed during the molding operation, a stripper; a pallet for receiving the cast articles from the stripper; and means for moving both the mold and pallet in different directions to and from registry with the stripper.

2. In a molding machine: a mold; a support for the mold upon which the mold is placed during the molding operation; a stripper; a pallet for receiving the cast articles from the stripper; and means for simultaneously moving the mold and the pallet in opposite directions into registry with the stripper, so that in one position they are in cooperative relation at the stripper, and in another position, the mold is on its support and the pallet is in unloading position.

3. In a molding machine: a mold; a support for the mold upon which the mold is placed during the molding operation; a stripper; a pallet for receiving the cast articles from the stripper; and means for moving the mold and pallet, comprising a source of motion adapted to move in opposite directions, and connections respectively from said source to the mold and to the pallet, said source being operable to bring the pallet and mold into registry at the stripper by one direction of motion of said source, and to simultaneously move the mold to filling position and the pallet to unloading position, by the opposite direction of motion.

4. In a molding machine: a mold; a support for the mold during the molding operation; a stripper; a pallet for receiving the cast articles from the stripper; a movable carriage for the pallet; means for causing the pallet to lower in response to the loading of the pallet with the cast articles; and means for moving both the mold and the carriage in opposite directions to and from registry with the stripper.

5. In a molding machine: a mold; a support for the mold during the molding operation; a stripper; a pallet for receiving the cast articles from the stripper; a movable carriage for the pallet; means for causing the pallet to lower in response to the loading of the pallet with the cast articles; and means for moving the mold and the carriage in different directions to place them into cooperative relation at the stripper, comprising a source of motion adapted to move in opposite directions; and links respectively connecting said source of motion with the mold and the pallet.

6. In a molding machine: a mold; a support for the mold upon which the mold is placed during the molding operation; a stripper; a pallet for receiving the cast articles from the stripper; and a reversible mechanism for moving the mold and pallet simultaneously in opposite directions into cooperative relation at the stripper, by one direction of motion, and for moving the mold to molding position and the pallet to unloading position by the other direction of motion.

7. In a molding machine: a mold; a support for the mold upon which the mold is placed during the molding operation; a stripper; a pallet for receiving the cast articles from the stripper; and a reversible mechanism for moving the mold and pallet simultaneously in opposite directions into cooperative relation at the stripper, by one direction of motion, and for moving the mold to molding position and the pallet to unloading position by the other direction of motion; said reversible mechanism including a gear and a pair of racks driven by the gear in opposite directions and respectively connected to the mold and the pallet.

8. In a molding machine: a mold; a support for the mold upon which the mold is placed during the molding operation; a stripper; a pallet for receiving the cast articles from the stripper; and a reversible mechanism operable by fluid pressure for moving the mold and pallet simultaneously in opposite directions into cooperative relation at the stripper, by one direction of motion, and for moving the mold to molding position and the pallet to unloading position by the other direction of motion.

9. In a molding machine: a mold; a support for the mold during the molding operation; a stripper; a pallet for receiving the cast articles from the stripper; a movable carriage for the pallet; means for causing the pallet to lower in response to the loading of the pallet with the cast articles; and means for simultaneously moving the mold and the carriage to place them into cooperative relation at the stripper, comprising a pair of fluid pressure cylinders, and links reversibly operable by fluid pressure in the cylinders, and connected respectively to the mold and the pallet carriage.

10. In a molding machine: a mold; a support for the mold upon which the mold is placed during the molding operation; a stripper; a pallet for receiving the cast articles from the stripper; means for causing the pallet and mold to move into cooperative relation at the stripper; and means operable in response to the attainment of said cooperative relation for effecting initial actuation of the stripper into the mold.

11. In a molding machine: a mold movable between a molding and a stripping position; a pallet movable between cooperative stripping position and an unloading position; a stripper, means for moving the mold and stripper; and means operable in response to the arrival of the mold and pallet at the stripper for effecting initial actuation of the stripper into the mold.

12. In a molding machine: a mold movable between a molding and a stripping position; a pallet movable between cooperative stripping position and an unloading position; a stripper, means for moving the mold and stripper to cooperative relation with the stripper, means for operating the stripper; and means operable automatically in response to the completion of the stripping operation for effecting actuation of said moving means and simultaneous movement of the mold to molding position and the pallet to unloading position.

13. In a molding machine: a mold movable between a molding and a stripping position; a pallet movable between cooperative stripping position and an unloading position; a stripper, means for moving the mold and stripper to cooperative relation with the stripper, means operable in response to the arrival of the mold and pallet at the stripper for operating the stripper; and means operable in response to the completion of the stripping operation for effecting actuation of said moving means and simultaneous movement of the mold to molding position and the pallet to unloading position.

14. In a molding machine: a mold; a vibratable support for the mold; a stripper; a pallet; means for moving the mold and the pallet into cooperative relation at the stripper and for returning the mold to the vibratable support; means for imparting vibration to the support; and means operable in response to the return of the mold to said support for effecting operation of said vibration imparting means.

15. In a molding machine: a mold movable between a molding and a stripping position, a pallet movable between cooperative stripping position and an unloading position; a stripper; fluid pressure means for operating the stripper; valve control means for said fluid pressure means; and means responsive to the arrival of the mold and pallet at the stripper for operating said control means through a stripping operation.

16. In a molding machine: a mold; a pallet; a stripper; fluid pressure means for moving the mold between a molding position and the stripper, as well as for moving the pallet between the unloading position and the stripper; valve control means for the fluid pressure means; and means responsive to the operation of the stripper in completing the stripping operation for operating the control means to cause the mold to return to molding position and the pallet to unloading position.

17. In a molding machine: a mold; a pallet; a stripper; fluid pressure means for moving the mold between a molding position and the stripper, as well as for moving the pallet between an unloading position and the stripper; valve control means for the fluid pressure means; means responsive to the operation of the stripper in completing the stripping operation for operating the control means to cause the mold to return to molding position and the pallet to unloading position; and manual means for operating the valve control means when the mold is in molding position, for causing the fluid pressure means to move the mold and pallet to the stripper.

18. In a molding apparatus: a mold; a stripper; means for bringing the mold into operative relation to the stripper; a pallet support beneath the stripper; a track along which the pallet support may be moved; and means causing the track to descend when the pallet support is loaded upon initial downward movement of the stripper into the mold.

19. In a molding apparatus: a mold; a stripper; means for bringing the mold into operative relation to the stripper; a pallet support beneath the stripper; a track for the pallet support; means causing the track to descend when the pallet support is loaded; and means for moving the pallet support along the track simultaneously with the motion of the mold toward the stripper.

20. In a molding machine: a mold; a support for the mold upon which the mold is placed during the molding operation; a pallet; a support for the pallet; a stripper between said mold support and pallet support; and means for moving the mold and the pallet from their respective supports toward each other into registry with the stripper.

21. In a molding machine: a mold; a support for the mold upon which the mold is placed during the molding operation; a pallet; a support for the pallet; a stripper between said mold support and pallet support; and means for moving the mold and the pallet from their respective supports simultaneously toward each other into registry with the stripper.

22. In a molding machine: a mold; a support for the mold upon which the mold is placed during the molding operation; a pallet; a support for the pallet; a stripper between said mold support and pallet support; and reversible means for moving the mold and the pallet from their respective supports simultaneously and in opposite directions to and from registry with said stripper.

23. In a molding machine: a mold; a support for the mold upon which the mold is placed during the molding operation; a pallet; a support for the pallet; a stripper between said mold support and pallet support; means for moving the mold and the pallet from their respective supports toward each other into registry with the stripper; and means operable in response to the attainment of said registering relation for effecting initial actuation of the stripper into the mold.

24. In a molding machine: a mold; a support for the mold upon which the mold is placed during the molding operation; a pallet; a support for the pallet; a stripper between said mold support and pallet support; means for moving the mold and the pallet from their respective supports simultaneously toward each other into registry with the stripper; and means operable in response to the arrival of the mold and pallet at the stripper for effecting initial actuation of the stripper into the mold.

25. In a molding machine: a mold; a support for the mold upon which the mold is placed during the molding operation; a pallet; a support for the pallet; a stripper between said mold support and pallet support; means for moving the mold and the pallet from their respective supports toward each other into registry with the stripper; means for operating the stripper; and means operable automatically in response to the completion of the stripping operation for effecting actuation of said moving means and simultaneous movement of the mold back to its support and of the pallet back to its support.

26. In a molding machine: a mold; a support for the mold upon which the mold is placed during the molding operation; a pallet; a support for the pallet; a stripper between said mold support and pallet support; fluid pressure means for moving the mold and pallet from their respective supports toward each other into registry with the stripper; valve control means for the fluid pressure means; fluid pressure means for operating the stripper; and means responsive to the operation of the stripper in completing the stripper operation for operating the control means to cause the mold to return to its support and the pallet to return to its support.

STEPHEN FLAM.

REFERENCES CITED

The following references are of record in the file of this patent:

UNITED STATES PATENTS

| Number | Name | Date |
|---|---|---|
| 685,473 | Hill | Oct. 29, 1901 |
| 881,815 | Merritt | Mar. 10, 1908 |
| 930,053 | Diefendorf | Aug. 3, 1909 |
| 1,029,559 | Pauly | June 11, 1912 |
| 1,317,118 | Whitney | Sept. 23, 1919 |
| 1,774,547 | Davis | Sept. 2, 1930 |
| 1,899,137 | Crume | Feb. 28, 1933 |
| 1,967,608 | Clingan et al. | July 24, 1934 |
| 2,270,829 | Wellnitz | Jan. 20, 1942 |
| 2,319,313 | Flam | May 18, 1943 |
| 2,341,012 | Billman et al. | Feb. 8, 1944 |
| 2,343,938 | Strong | Mar. 14, 1944 |
| 2,413,109 | Leipold et al. | Dec. 24, 1946 |
| 2,431,034 | Gelbman | Nov. 18, 1947 |